US012113683B2

(12) United States Patent
Paczkowski et al.

(10) Patent No.: US 12,113,683 B2
(45) Date of Patent: Oct. 8, 2024

(54) IMMUTABLE ARCHIVING OF REMOTE CONTROLLED USER EQUIPMENT TELEMETRY-COMMAND DATA FOR WIRELESS COMMUNICATIONS NETWORKS SYSTEMS AND APPLICATIONS

(71) Applicant: T-MOBILE INNOVATIONS LLC, Overland Park, KS (US)

(72) Inventors: Lyle Walter Paczkowski, Mission Hills, KS (US); Marouane Balmakhtar, Fairfax, VA (US); Galip Murat Karabulut, Vienna, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/053,268

(22) Filed: Nov. 7, 2022

(65) Prior Publication Data
US 2024/0154887 A1 May 9, 2024

(51) Int. Cl.
*H04L 43/04* (2022.01)
*H04L 67/125* (2022.01)

(52) U.S. Cl.
CPC ............ *H04L 43/04* (2013.01); *H04L 67/125* (2013.01)

(58) Field of Classification Search
CPC ....... H04L 43/04; H04L 43/045; H04L 67/12; H04L 67/125; H04L 67/025; H04L 67/56; H04W 4/30
See application file for complete search history.

(56) References Cited

U.S. PATENT DOCUMENTS

| 11,388,068 B1 | 7/2022 | Balmakhtar et al. | |
| 2013/0290427 A1* | 10/2013 | Proud | H02J 50/40 709/204 |
| 2019/0377336 A1* | 12/2019 | Avery | H04L 67/10 |
| 2020/0019931 A1* | 1/2020 | Prabhakar | H04W 12/126 |

(Continued)

OTHER PUBLICATIONS

Rabkin, Barry "GCPs v. PPK/RTK: Which is Best to Receive Fast and Accurate Data?," Posted at 11:34h in Drone Leasing, Drone Technology, UAV Surveying, UAV Technology, https://www.identifiedtech.com/blog/drone-technology/gcps-ppk-rtk-best-receive-fast-accurate-data/#:~: text=Real%20Time%20Kinematic%20, Jul. 12, 2022, pp. 1-6.

(Continued)

*Primary Examiner* — Johnny B Aguiar
(74) *Attorney, Agent, or Firm* — Shook, Hardy & Bacon L.L.P.

(57) ABSTRACT

Immutable archiving of remote controlled user equipment telemetry-command (TC) data for wireless communications networks systems and applications is provided. In some embodiments, one or more applications executing on the UE report selected TC data to a TC data archiving function. TC data is both captured and preserved by the TC data archiving function in a manner that establishes sufficient integrity for the data for the purpose of establishing an immutable record comprising at least the operating state of a remote operated UE, and commands that a controller UE was sending to the remote operated UE. Determining the TC data selected for archiving may be based on an inflection criteria. In some embodiments, a session block sequence is generated using a distributed application (DApp), and TC data is reported to the TC data archiving function using the session block sequence.

20 Claims, 14 Drawing Sheets

(56) References Cited

U.S. PATENT DOCUMENTS

| | | | | |
|---|---|---|---|---|
| 2020/0112776 | A1* | 4/2020 | Rezek | H04L 43/08 |
| 2021/0233672 | A1* | 7/2021 | Patil | H04W 4/70 |
| 2022/0164333 | A1* | 5/2022 | Kim | G05B 9/02 |
| 2022/0229936 | A1* | 7/2022 | Sohail | G06F 16/2379 |
| 2023/0052343 | A1* | 2/2023 | Riedy | G06V 20/176 |

OTHER PUBLICATIONS

Trop, Jaclyn "Halo Car's teleoperated car-sharing Service to roll out this year with no one behind the wheel," TechCrunch, Oct. 5, 2022 5:57 PM MDT, https://techcrunch.com/2022/10/05/halo-cars-teleoperated-car-sharing-service-to-roll-out-this-year-with-no-one-behind-the-wheel, pp. 1-8.

Unknown, "RTK Drones: What You Should Know," https://www.pix-pro.com/rtk-drones/, downloaded from internet on Oct. 24, 2022, pp. 1-5.

Unknown, "Real-time kinematic positioning," Wikipedia, https://en.wikipedia.org/wiki/Real-time_kinematic_positioning, last updated Jun. 5, 2022, at 7:15 (UTC), pp. 1-3.

McNabb, Miriam "Drone Connectivity Solutions: Elsight Delivers Communications for Multi-Domain Autonomous Ops," Feb. 28, 2022, pp. 1-4.

U.S. Appl. No. 17/560,709, filed Dec. 23, 2021.

* cited by examiner

IMMUTABLE ARCHIVING OF REMOTE CONTROLLED USER EQUIPMENT TELEMETRY-COMMAND DATA FOR WIRELESS COMMUNICATIONS NETWORKS SYSTEMS AND APPLICATIONS

BACKGROUND

Recent advancements in various forms of artificial intelligence and computer processing have resulted an explosion in the development of autonomous vehicles and myriads of other autonomous machines. For example, several major automakers are developing autonomous and semi-autonomous vehicles, though many are not yet fully autonomous. Semi-autonomous machines may include remote controlled machines such as automobiles, airborne drones, urban air mobility (UAM) vehicles, passenger aircraft, and non-mobile machines, such as manufacturing equipment, robots or building systems.

Many remote controlled machines may operate, at least in part, on command and telemetry data communicated between remotely located controller user equipment and the remote controlled machine, delivered via a wireless communications network operated by a wireless services provider (e.g., a wireless carrier). For example, a remote controlled machine (e.g., such as a remote piloted drone and/or remote piloted automobile) may maneuver and perform other function based at least in part on command data issued by user equipment operating as a controller and delivered via a wireless communications network. The controller may receive telemetry data from the remote controlled machine (e.g., velocity, position, sensor data, images from internal and external cameras and/or video image streams) that is delivered via the wireless communications network, and which may be used by a remote pilot or operator at the controller to determine what commands to issue to the remote controlled machine. It follows that when an incident occurs where the operation of the remote controlled machine is involved in an incident (e.g., an accident) the ability to perform a successful investigation may hinge on the availability of an accurate record of the command and telemetry data exchanged between the controller and the remote controlled machine.

SUMMARY

The present disclosure is directed, in part to immutable archiving of user equipment telemetry-command (TC) data for wireless communications networks, substantially as shown and/or described in connection with at least one of the Figures, and as set forth more completely in the claims.

In contrast to currently available network logging technologies, embodiments of the present disclosure provide for, among other things, using a wireless communication network to intelligently capture an immutable archive of telemetry and command data (which may be referred to herein as telemetry-command data, or TC data) communicated between a controller user equipment (UE) and a remote controlled UE. In some embodiments, one or more applications executing on the UE report selected TC data to a TC data archiving function that may operate as a component of the operator core network of a telecommunications network. TC data is both captured and preserved by the TC data archiving function in a manner that establishes sufficient integrity for the data for the purpose of establishing an immutable record of the operating state of the remote operated UE, and the commands that the controller UE was sending to the remote operated UE. In some embodiments, instead of reporting all TC data to the TC data archiving function, application(s) (e.g., on the controller UE and/or the remote controlled UE) may filter the TC data reported to the TC data archiving function based on an inflection criteria. The application on the UE may be implemented at least in part using a distributed application, smart contract, and/or similar block-chain technology that is authenticated with the TC data archiving function implemented by the operator core network to ensure that TC data sent to the TC data archiving function is from a trusted data source and remains immutable as it is received by the TC data archiving function and stored in the immutable archive.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
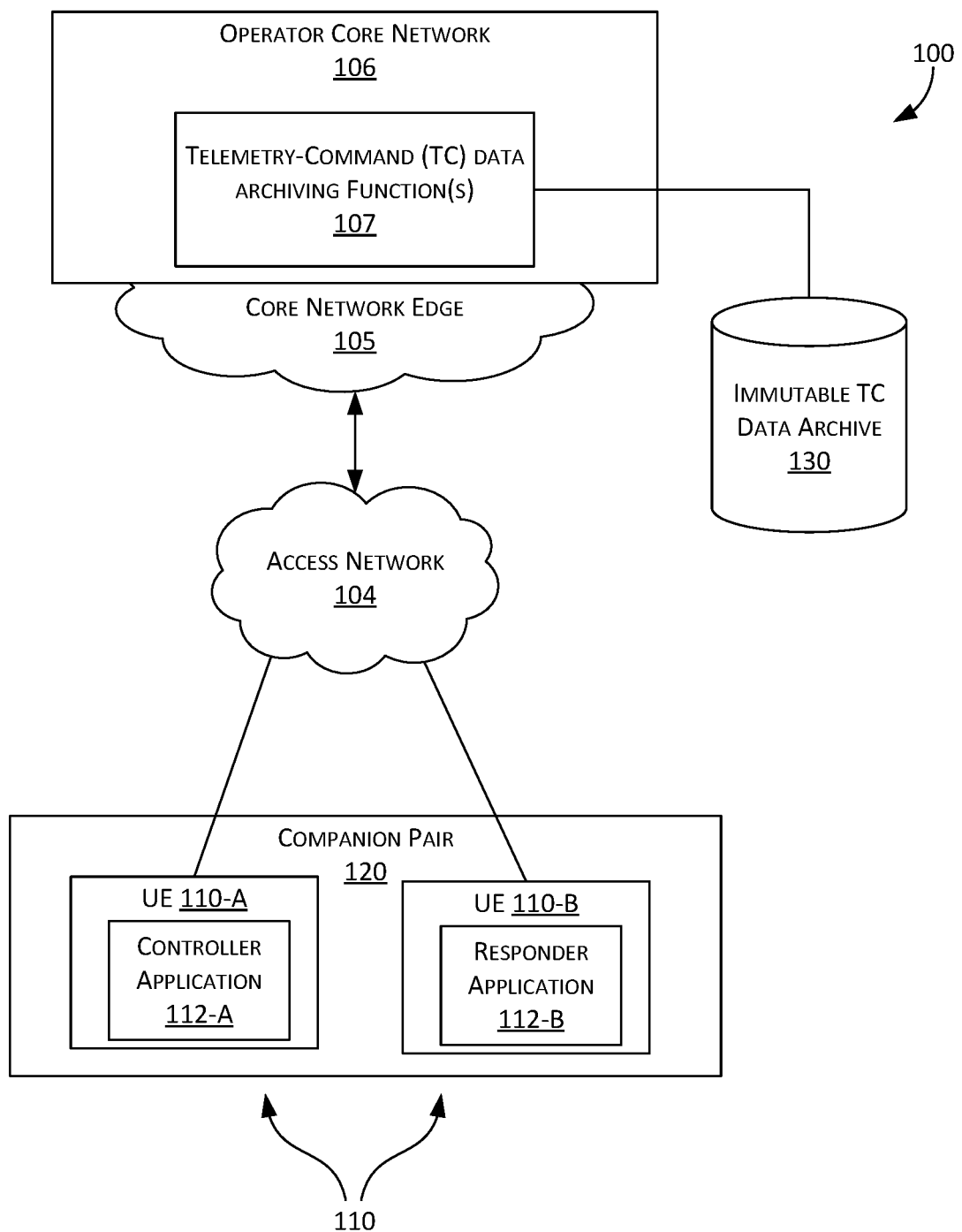
FIG. 1 is a diagram illustrating an example network environment, in accordance with some embodiments described herein.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

One or more of the embodiments presented in the disclosure provide for, among other things, system and methods to intelligently capture an immutable archive of data communicated between a remote operated user equipment (UE) and a controller UE over a wireless communications network. The controller UE nay be operated by a human user (e.g., a human pilot or operator), a virtual user (e.g., a computer implemented pilot and/or a pilot implemented using an artificial intelligence (AI) model), or a combination of both.

Network generated logs generated from verbose logging represent one technique that may be used to chronical events pertaining to network connected UE such as a remote controlled UE. However, verbose logging is costly in terms of network computing, storage, and bandwidth resources. For each remote operated UE, verbose logging consumes substantial network bandwidth and may cause the operator of a remote operated UE to incur significant data fees for using the wireless communications network and for storage of the resulting logs. Given the resulting large volume of data collected in logs, it may also take substantial time and efforts to evaluate the data if an event with the remote controlled UE occurs that warranted use of the logs. Moreover, there is no assurance that the logs would actually capture data pertinent to better understanding the event. Importantly, standard verbose logging includes no mechanism to certify that the data is accurate and free from unauthorized modification or tampering. As such, there is no tenable technology currently available for capturing and archiving TC data communicated over wireless networks that is used in conjunction with controlling remotely operated machinery.

In contrast to currently available network logging technologies, embodiments of the present disclosure provide for, among other things, using a wireless communication network to intelligently capture an immutable archive of telemetry and command data (which may be referred to herein as telemetry-command data, or TC data) communicated between remote operated user equipment (UE) and a controller UE. In some embodiments, one or more applications executing on a UE send selected TC data to a TC data archiving function. The TC data archiving function may operate as a component of the operator core network of a telecommunications network. As further described below, the TC data is both captured and preserved by the TC data archiving function in a manner that establishes sufficient integrity of the data for the purpose of establishing an immutable record of the operating state of the remote operated UE, and commands the controller UE was sending to the remote operated UE. In some embodiments, the TC data is selectively captured so that the TC data sent from a UE to the TC data archiving function is a subset of the TC data communicated between a controller UE and its companion remote controlled UE. The selection of TC data to form a subset for archiving may be tailored based on the mission and/or purpose of the remote controlled UE. For example, the type of TC data collected for a remote controlled aerial drone may comprise different types of TC data than collected for a remote piloted automobile or robot. In some embodiments, the type of data collected to serve as TC data is determined from considerations such as, but not limited to, the device type of the UE, specific functions performed by the UE, a stage of UE operation (e.g., an initial mission stage, steady state operation stage, and/or a mission completion sage), and/or the type or service level (for example, the network slice) being offered to that UE by the wireless communications network.

In some embodiments, the controller UE and its paired companion remote controlled UE may each comprise distinct devices that individually establish connections to the wireless communications network. The companion pair of UE may communicate TC data with each other through their respective connections to the wireless communications network. In such embodiments, the controller UE may comprise an application that captures and reports to the TC data archiving function, TC data comprising command data. The remote controlled UE may comprise an application that captures and reports to the TC data archiving function, TC data comprising telemetry data. The telemetry data may include measurements or other state variable representing an operating response of the remote controlled UE to the command data received from the controller UE. In some embodiments, instead of reporting all TC data to the TC data archiving function, the application (on the controller UE and/or the remote controlled UE) may filter the TC data reported to the TC data archiving function based on an inflection criteria, as further discussed below. Also as described below, the application on the UE may be implemented at least in part using a distributed application, smart contract, and/or similar block-chain technology that is authenticated with the TC data archiving function implemented by the operator core network to ensure that TC data sent to the TC data archiving function is from a trusted data source and remains immutable as it is received by the TC data archiving function, and as stored in the immutable archive. In some embodiments, the remote controlled UE and the controller UE are registered together as an operating companion pair of UE so that the TC data sent received from each is linked or otherwise associated together as stored in the immutable archive. In some embodiments, distributed ledger technology (DLT) or other block-chain related technology may be utilized to securely capture and store the TC data to ensure that the immutable archive provides data having integrity and free from manipulation. From the immutable TC archive, the TC data can later be retrieved in response to an investigation involving a UE incident.

In some embodiments, the controller UE and its paired companion remote controlled UE may communicate to each other over a direct point-to-point communication link, and either one or the other establish a connection to the wireless communications network. In such cases, the UE of the companion pair with the connection to the wireless communication network may comprise the application that reports TC data to the TC data archiving function on behalf of both members of the companion pair. Moreover, as explained below, the UE that is connected with the wireless communication network may execute an authentication protocol that establishes and/or authenticates a device identifier (device ID) for the other (non-network connected) UE so that the TC data reported to TC data archiving function may still be indicative of which of the two UE of the companion pair generated the TC data being reported.

Advantageously, embodiments presented herein provide technical solutions representing advancements over existing technologies by establishing an efficient process for capturing and archiving a selected set of TC data that documents the communications occurring between a controller UE and its paired companion remote controlled UE. The solutions provided by the TC data archiving service implemented by the systems and methods described herein reduce network congestion and consumption of processing resource within the operating core network (e.g., by collecting selected subsets of TC data) which in itself represents a technical improvement to the underlying system. The network operating core thus also benefits from greater processing and bandwidth margins, which means that the network has greater margin for supporting additional functionalities since those resources are not being consumed processing verbose logging sessions.

Throughout the description provided herein several acronyms and shorthand notations are used to aid the understanding of certain concepts pertaining to the associated system and services. These acronyms and shorthand notations are intended to help provide an easy methodology of communicating the ideas expressed herein and are not meant to limit the scope of embodiments described in the present disclosure. Unless otherwise indicated, acronyms are used in their common sense in the telecommunication arts as one skilled in the art would readily comprehend. Further, various technical terms are used throughout this description. An illustrative resource that fleshes out various aspects of these terms can be found in Newton's Telecom Dictionary, 31st Edition (2018).

It should be understood that the UE discussed herein are in general forms of equipment and machines such as but, not limited to, Internet-of-Things (IoT) devices and smart appliances, autonomous or semi-autonomous vehicles including cars, trucks, trains, aircraft, watercraft, spacecraft, urban air mobility (UAM) vehicles and/or drones, industrial machinery, robots, robotic devices, exoskeletons, manufacturing tooling, thermostats, locks, smart speakers, lighting devices, smart receptacles, controllers, mechanical actuators, remote sensors, weather or other environmental sensors, wireless beacons, high science appliances, or any other smart device that at least in part operated based on data received via a network. That said, in some embodiments, UE may also include handheld personal computing devices such as cellular phones, tablets, and similar consumer equipment, and/or desktop computing devices, laptops, workstations, servers and/or network infrastructure equipment. As such, the UE may include both mobile UE and stationary UE.

FIG. 1 is a diagram illustrating an example network environment 100 embodiment for a wireless communication system. Network environment 100 is but one example of a suitable network environment and is not intended to suggest any limitation as to the scope of use or functionality of the embodiments disclosed herein. Neither should the network environment be interpreted as having any dependency or requirement relating to any one or combination of components illustrated.

As shown in FIG. 1, network environment 100 comprises an operator core network 106 (also referred to as a "core network") that provides one or more network services to one or more UE 110 via at least one access network 104. Operator core network 106 may include, or is otherwise coupled to, TC data archiving function(s) 107, among other network functions further discussed herein. In some embodiments, network environment 100 comprises, at least in part, a wireless communications network.

In some embodiments, the access network 104 comprises one or more radio access networks (RANs). A RAN is often referred to as a base station, cell site, or cellular base station. The RAN may implement wireless connectivity using, for example, 3GPP technologies. The access network 104 may be referred to as an eNodeB in the context of a 4G Long-Term Evolution (LTE) implementation, a gNodeB in the context of a 5G New Radio (NR) implementation, or other terminology depending on the specific implementation technology. In some embodiments, the access network 104 comprises a non-3GPP customer premises network, such as a local area network or intra-net comprising one or more wireless access points (APs) such as, but not limited to, IEEE 802.11 (WiFi), and/or IEEE 802.15 (Bluetooth) access points.

The access network 104 may comprise a multi-modal network (for example comprising one or more multi-modal access devices) where multiple radios supporting different systems are integrated into the access network 104. Such a multi-modal access network 104 may support a combination of 3GPP radio technologies (e.g., 4G, 5G and/or 6G) and/or non-3GPP radio technologies. In some embodiment, the access network 104 may comprise a terrestrial wireless communications base station and/or may be at least in part implemented as a space-based access network (e.g., comprising a space-based wireless communications base station).

In particular, individual UE 110 may communicate with the operator core network 106 via the access network 104 over one or both of uplink (UL) radio frequency (RF) signals and downlink (DL) radio frequency (RF) signals. The access network 104 may be coupled to the operator core network 106 via a core network edge 105 that comprises wired and/or wireless network connections that may themselves include wireless relays and/or repeaters. In some embodiments, the access network 104 is coupled to the operator core network 106 at least in part by a backhaul network such as the Internet or other public or private network infrastructure. Core network edge 105 comprises one or more network nodes or other elements of the operator core network 106 that may define the boundary of the operator core network 106 and may serve as the architectural demarcation point where the operator core network 106 connects to other networks such as, but not limited to access network 104, the Internet, or other third-party networks.

It should be understood that in some aspects, the network environment 100 may not comprise a distinct network operator core 106, but rather may implement one or more features of the network operator core 106 within other portions of the network, or may not implement them at all, depending on various carrier preferences.

Generally, an individual UE 110 may comprise a device capable of unidirectional or bidirectional communication with the access network 104 via wireless and/or wired communication links. The network environment 100 may be configured for wirelessly connecting UEs 110 to other UEs 110 via the same access network 104, via other access networks, via other telecommunication networks, and/or to connect UEs to a publicly-switched telecommunication network (PSTN). The network environment 100 may be generally configured for wirelessly connecting a UE 110 to data or services that may be accessible on one or more application servers or other functions, nodes, or servers. In some implementations, one or more remote services operate as servers for operating data (such as environmental data, traffic condition data, navigation and/or other operating commands) delivered to one or more of the UE 110 and utilized for operation of the UE 110.

In the embodiment shown in FIG. 1, the UE 110-A and UE 110-B form an operating UE companion pair 120 where the UE 110-A operates as a controller UE and the UE 110-B operates as a remote controlled UE. That is, the UE 110-B is responsive to commands communicated from the UE 110-A as command data. Command data may include instructions for performing operations on the remote controlled UE 110-B such as driving, positioning, maneuvering, navigating, controlling actuators, motors, electronics and/or other components. In this example embodiment, the controller UE 110-A and the remote controlled UE 110-B individually establish connections to the network operator core 106 via the access network 104 and communicate TC data with each other through their respective connections the wireless communications network of network environment 100. As discussed herein, in other embodiments, the controller UE 110-A and the remote controlled UE 110-B may communicate with each other via other configurations.

TC data reported by the UE 110-A and UE 110-B may be captured by TC data archiving function(s) 107 and stored as in an immutable TC data archive 130. The capture and storing of TC data to the immutable TC data archive 130 may be provided by the network operator of networking environment 100 as a service such that when the operating UE companion pair 120 obtain authorization to connect with the network operator core 106, the network operator core 106 may activate a TC data archiving service between the operating UE companion pair 120 and the TC data archiving function(s) 107.

Figure 11:
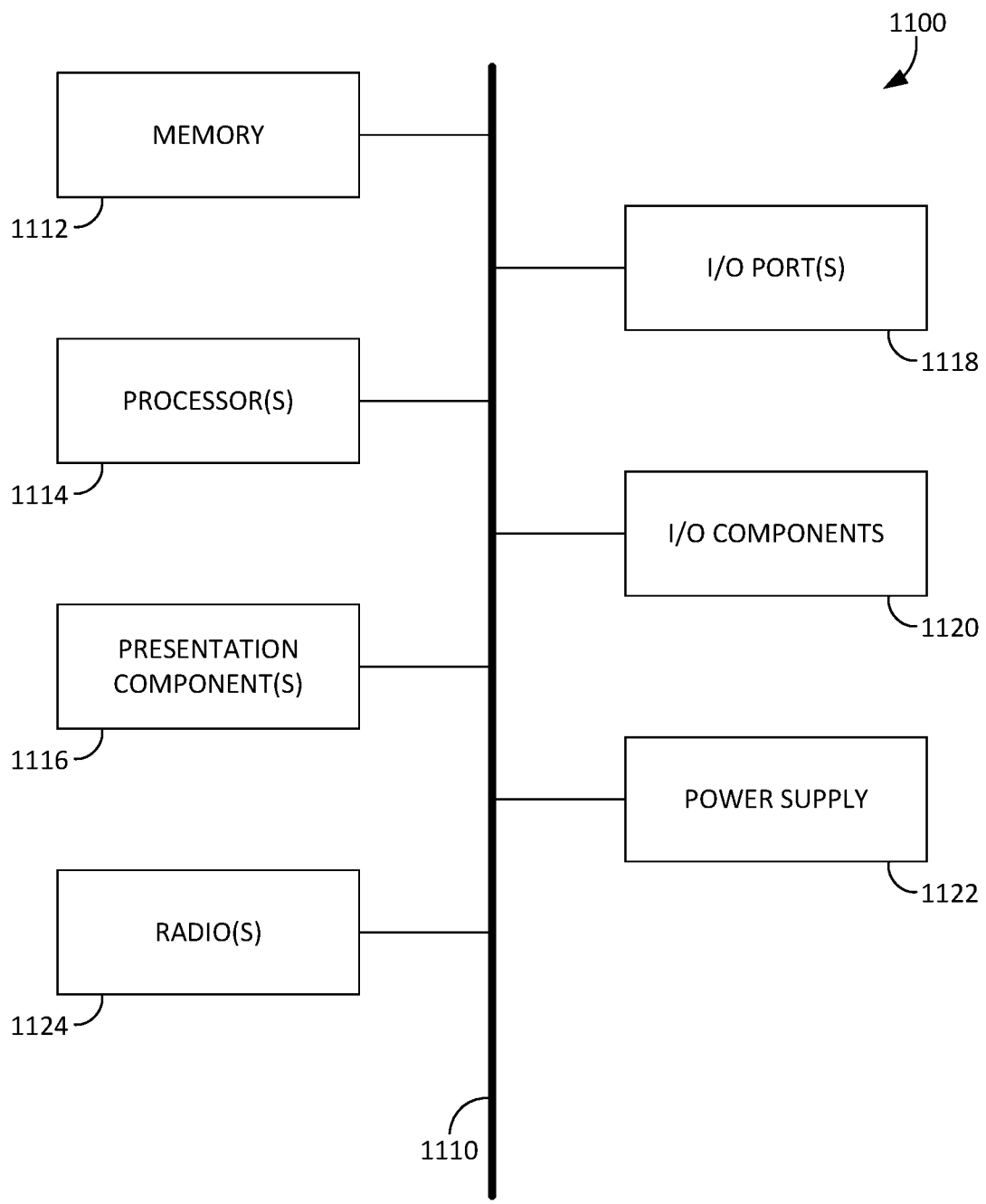
FIG. 11 is an example computing device, in accordance with some embodiments described herein.
Figure 12:
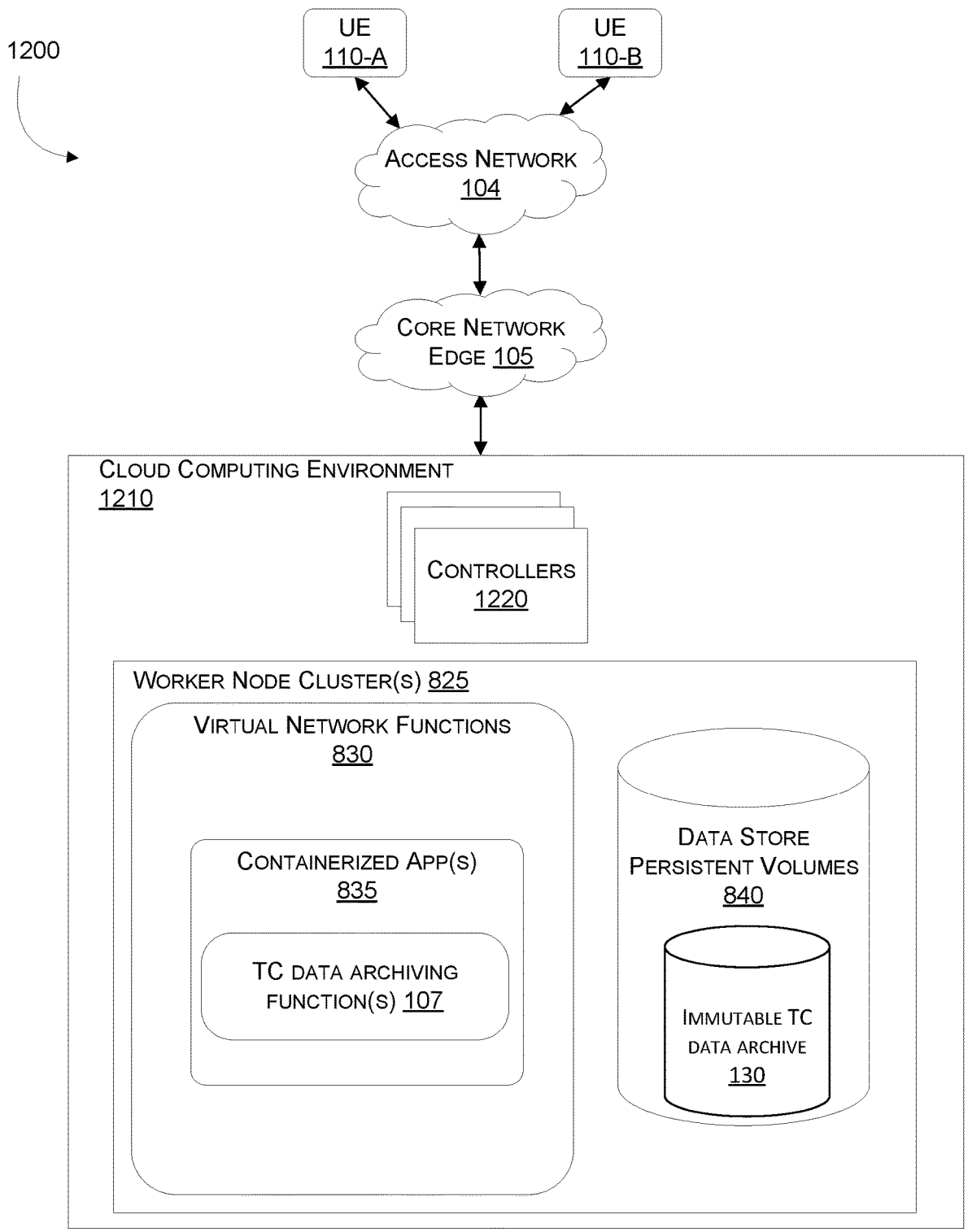
FIG. 12 is an example cloud computing platform, in accordance with some embodiments described herein.

The TC data archiving function(s) 107 may be implemented as a network function executed by a network node of the network operator core 106 and/or the core network edge 105. In some embodiments, the functions and services provided by the TC data archiving function(s) 107 may be implemented by one or more processors executing instructions, and/or performing operations, that cause the processor to perform those functions of the TC data archiving function(s) 107 (and subcomponents thereof) as described herein. In some embodiments, the TC data archiving function(s) 107 may be implemented using a computing device 1100 as shown in FIG. 11 and/or cloud computing environment 1210 as shown in FIG. 12.

As discussed in greater detail below, the immutable TC data archive 130 may comprise an element of a distributed ledger network (DLN) and/or distributed ledger technology (DLT) based archive comprising part of, or otherwise coupled to, the network operator core 106. It should be understood that TC data is used herein as an umbrella term referring to data that may include telemetry data, command data, and/or a combination of both telemetry and command data.

The UE 110-A and UE 110-B may each comprise a respective application (shown at 112-A and 112-B) to select and report telemetry and command (TC) data to the TC data archiving function(s) 107. For example, the controller UE 110-A may comprise a controller application 112-A that captures and reports TC data comprising command data to the TC data archiving function 107. Command data may include commands, for example, instructing the remote controlled UE 110-B to perform one or more operations and/or maneuvers. For example, command data may instruct the remote controlled UE 110-B to turn left or right (and indicate how many degrees to turn) or change speed, or comprise a vector or coordinate indicating a position that the remote controlled UE 110-B is direct to move to. Other commands may include, for example, turning on or off sensors (e.g., cameras, RADAR, Lidar), lighting, and/or other on-board components (e.g., to extend landing gear, to lock/unlock doors). The controller application 112-A may apply an inflection criteria to determine which command data is reported to the TC data archiving function 107, and/or which is not. An inflection criteria may refer to a predefined set of conditions, events, or actions, which are defined as representing inflection points where a significant change occurs. For example, inflection criteria may define that a navigation correction, or change in path or speed, exceeding an established threshold represents an inflection point. Commands that operate certain components of the UE 110-B may be predefined as inflection points per the inflection criteria. For example, turning on an in-cabin convenience light may not be classified as an inflection point while turning on headlamps or other exterior lighting may be classified as an inflection point.

Similarly, the remote controlled UE 110-B may comprise a responder application 112-B that captures and reports TC data comprising telemetry data to the TC data archiving function 107. Telemetry data may include, for example, one or more state variables representing the operating state of the remote operated UE 110-B. Telemetry data, as that term is used herein, may include, but is not limited to, position data, velocity data, component statuses, component configurations, sensor data, alarm flags, and/or any other data measured, detected, synthesized, and/or derived as a computed representative of the state of a UE 110. The responder application 112-B may apply an inflection criteria to determine which telemetry data is reported to the TC data archiving function 107, and/or which is not. An inflection criteria may refer to a predefined set of conditions, events, or actions that are defined as representing inflection points where a significant change occurs. For example, the inflection criteria may define that telemetry data reported at TC data to the TC data archiving function 107 include changes to measurements or other state variable representing an operating response of the remote controlled UE 110-B to command data received from the controller UE 110-A. The inflection criteria may define an inflection threshold that defines the magnitude of change that would trigger reporting the telemetry data. In some embodiments, the operator of certain predefined components, alarm conditions, and/or sensor measurement crossing an inflection threshold, may comprise inflection points reported to the TC data archiving function 107 (e.g., even when they do not directly occur in response to command data from the UE 110-A). For example, the occurrence of a component high-temperature alarm, or low-battery alarm, or other events, may be classified as an inflection point and therefore an event reported as TC data to the TC data archiving function 107.

Figure 2:
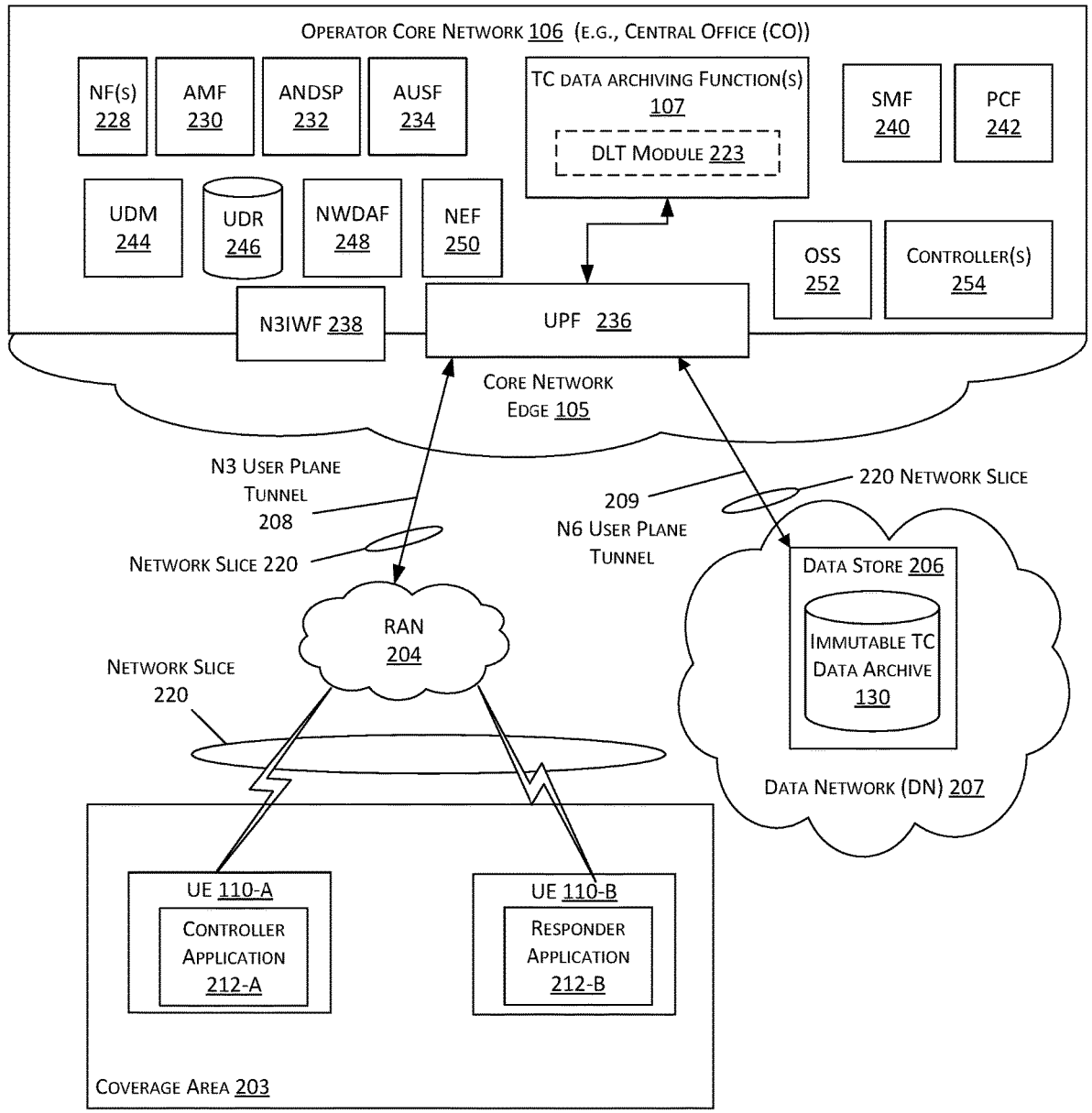
FIG. 2 is a diagram illustrating an example implementation of a networking environment comprising Radio Access Network (RAN), in accordance with some embodiments described herein.

Referring now to FIG. 2, FIG. 2 illustrates an example implementation of the networking environment 100 of FIG. 1, wherein the access network 104 comprising at least a 3GPP based Radio Access Network (RAN) 204. In some embodiments, the RAN 204 comprises a radio access network (RAN), often referred to as a cellular base station. The RAN 204 may be referred to as a gNodeB in the context of a 5G New Radio (NR) implementation, or other terminology depending on the specific implementation technology. In some embodiments, the RAN 104 may comprise in part components of a customer premises network, such as a distributed antenna system (DAS) for example. In some embodiments, the RAN 204 may comprise a non-terrestrial base station, such as a base station implemented by an Earth orbiting satellite. The UE 110 may operate within a coverage area 203 of the RAN 204.

In some implementations, the operator core network 106 may comprise modules, also referred to as network functions (NFs), generally represented in FIG. 2 as NF(s) 228. Such network functions may include, but are not limited to, one or more of a core access and mobility management function (AMF) 230, an access network discovery and selection policy (ANDSP) 232, an authentication server function (AUSF) 234, a user plane function (UPF) 236, non-3GPP Interworking Function (N3IWF) 238, a session management function (SMF) 240, a policy control function (PCF) 242, unified data management (UDM) 244, an unified data repository (UDR) 246, Network Data Analytics Function (NWDAF) 248, a network exposure function (NEF) 250, and an operations support system (OSS) 252. Implementation of these NFs of the operator core network 106 may be executed by one or more controllers 254 on which these network functions are orchestrated or otherwise configured to execute utilizing processors and memory of the one or more controllers 254. The NFs may be implemented as physical and/or virtual network functions. In this example embodiment, the TC data archiving function(s) 107 may be implemented as network function (NF) of the operator core network 106.

Notably, nomenclature used herein is used with respect to the 3GPP 5G architecture. In other aspects, one or more of the network functions of the operator core network 106 may take different forms, including consolidated or distributed forms that perform the same general operations. For example, the AMF 230 in the 3GPP 5G architecture is configured for various functions relating to security and access management and authorization, including registration management, connection management, paging, and mobility management; in other forms, such as a 4G architecture, the AMF 230 of FIG. 2 may take the form of a mobility management entity (MME). The operator core network 106 may be generally said to authorize rights to and facilitate access to an application server/service such as provided by application function(s) requested by any of the UE 110. In some embodiments, at least one data network (DN) 207 may be coupled to the operator core network 106, for example via the network edge 105.

As shown in FIG. 2, UPF 236 represents at least one function of the operator core network 106 that extends into the core network edge 105. In some embodiments, the RAN 105 is coupled to the UPF 236 within the core network edge 105 by a communication link that includes an N3 user plane tunnel 208. For example, the N3 user plane tunnel 208 may connect a cell site router of the RAN 204 to an N3 interface of the UPF 236. In some embodiments, the TC data archiving function(s) 107 may be a network function coupled to the UPF 236 and receive TC data from UE 110 via the UPF 236. In some embodiments, the immutable TC data archive 130 may be implemented at least in part as at least one data store 206 within DN 207 that is coupled to the UPF 236 in the core network edge 105 by a N6 user plane tunnel 209. For example, the N6 user plane tunnel 209 may connect a network interface (e.g., a switch, router and/or gateway) of the DN 207 to an N6 interface of the UPF 236. In some embodiments, the immutable TC data archive 130 may be implemented at least in part as a component of the operator core network 106.

The AMF 230 facilitates mobility management, registration management, and connection management for 3GPP devices such as a UE 110. ANDSP 232 facilitates mobility management, registration management, and connection management for non-3GPP devices. AUSF 234 may receive authentication requests from the AMF 230 and interacts with UDM 244, for example, for SIM authentication and/or to authenticate a UE 110 based on another device ID, as discussed below. N3IWF 238 provides a secure gateway for non-3GPP network access, which may be used for providing connections for UE 110 access to the operator core network 106 over a non-3GPP access network (such as discussed with respect to FIG. 3). SMF module 240 facilitates initial creation of protocol data unit (PDU) sessions using session establishment procedures. The PCF 242 maintains and applies policy control decisions and subscription information. Additionally, in some aspects, the PCF 242 maintains quality of service (QoS) policy rules. For example, the QoS rules stored in a unified data repository (UDR) 246 can identify a set of access permissions, resource allocations, or any other QoS policy established by an operator. In some embodiments, the PCF 242 maintains subscription information indicating one or more services and/or micro-services subscribed to by each UE 110. Such subscription information may include subscription information pertaining to a subscription for TC data archiving services provided by the TC data archiving function 107. As shown in FIG. 2, the TC data archiving function 107 may comprise a DLT module 223. Using the DLT module 223, the TC data archiving function 107 may store TC data in the immutable TC data archive 130 as a distinct distributed ledger entity (e.g., as a block-chain) traceable back to a specific UE 110. Moreover, the immutable TC data archive 130 may comprise TC data associated with a specific session during which an operating UE companion pair 120 was in connection with the network operator core 106.

The UDM 244 manages network user data including, but not limited to, data storage management, subscription management, policy control, and core network 106 exposure. NWDAF 248 collects data (for example, from UE, other network functions, application functions and operations, administration, and maintenance (OAM) systems) that can be used for network data analytics. The OSS 252 is responsible for the management and orchestration of the operator core network 106, and the various physical and virtual network functions, controllers, compute nodes, and other elements that implement the operator core network 106.

Some aspects of operating environment 100 include the UDR 246 storing information relating to access control and service and/or micro-service subscriptions, for example subscription information pertaining to a subscription for TC data archiving services provided by the TC data archiving function 107. The UDR 246 may be configured to store information relating to such subscriber information and may be accessible by multiple different NFs in order to perform desirable functions. For example, the UDR 246 may be accessed by the AMF 230 in order to determine subscriber information pertaining the TC data archiving function 107, accessed by a PCF 242 to obtain policy related data, accessed by NEF 250 to obtain data that is permitted for exposure to third party applications (such as applications 112-A and/or 112-B executed by a UE 110, for example). Other functions of the NEF 250 include monitoring of UE related events and posting information about those events for use by external entities, and providing an interface for provisioning UEs (via PCF 242) and reporting provisioning events to the UDR 246. Although depicted as a unified data management module, UDR 246 can be implemented as a plurality of network function (NF) specific data management modules.

The UPF 236 is generally configured to facilitate user plane operation relating to packet routing and forwarding, interconnection to a data network (e.g., DN 207), policy enforcement, and data buffering, among other operations. Using network slicing (e.g., using 5G software-defined networking (SDN) and/or 5G network slice selection function (NSSF)), the UPF 236 may establish a dedicated network slice 220 for the TC data archiving function 107 that operates, in essence, as a distinct network (for example, establishing its own QoS, provisioning, and/or security) within the same physical network architecture of the core network edge 105. For example, in different implementations, a UE 110 may be assigned a network slice 220 such as an Enhanced Mobile Broadband (eMBB) 5G network slice, a Massive Machine Type Communications (MMTC) 5G network slice, an Ultra-Reliable Low Latency Communication (URLLC) 5G network slice, or a Public Safety (PS) 5G network slice.

Figure 3:
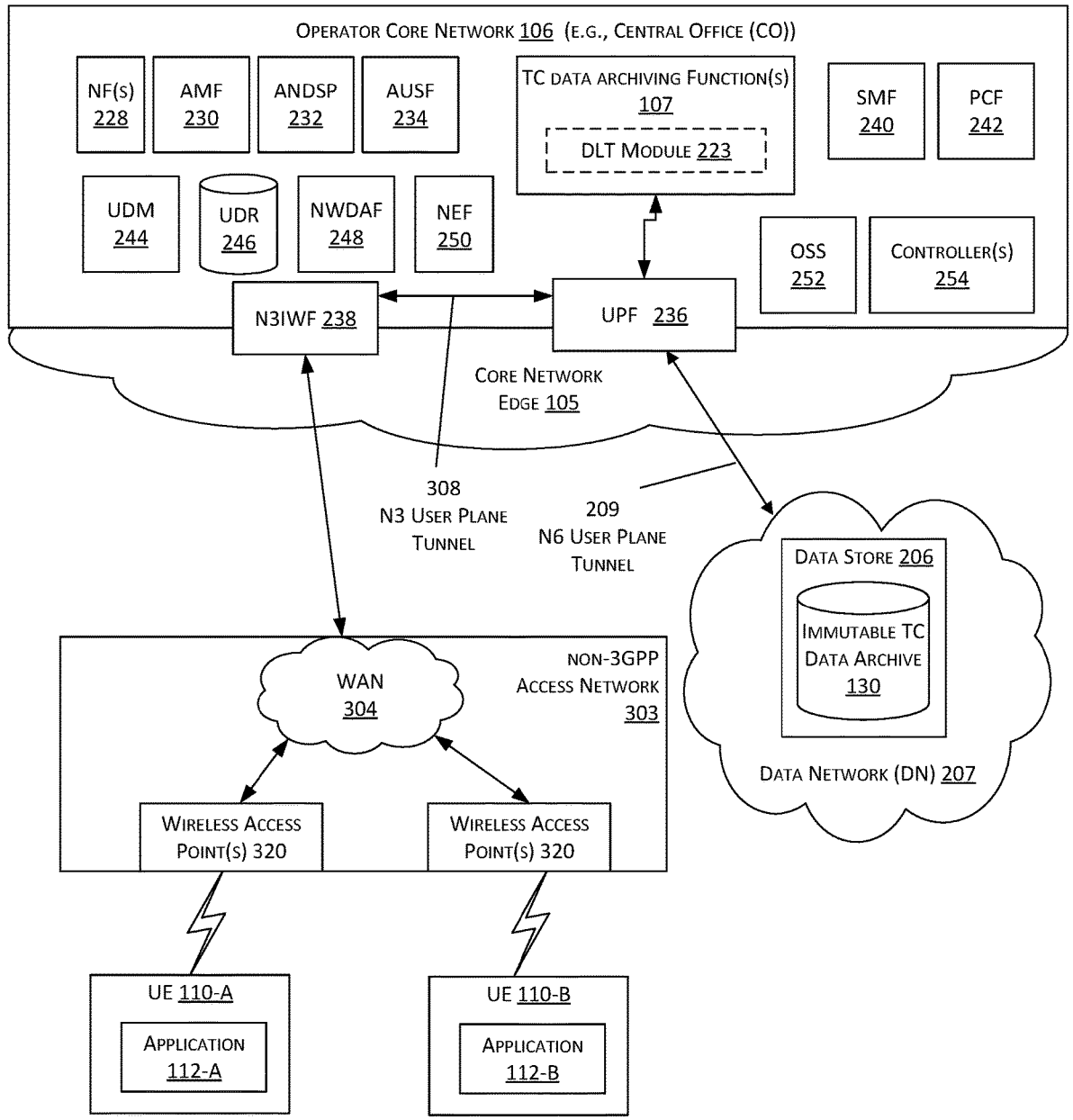
FIG. 3 is a diagram illustrating an example implementation of a networking environment comprising a non-3GPP based access network, in accordance with some embodiments described herein.

Referring now to FIG. 3, FIG. 3 illustrates an example implementation of the networking environment 100 of FIG. 1, wherein the access network 104 comprises a non-3GPP access network 303 (such as a customer premise equipment (CPE) network for example). For example, the access network 303 may comprise a wide area network (WAN) 304, that includes one or more wireless access points (WAPs) 320. In such embodiments, the non-3GPP access network 303 represents an untrusted network from the perspective of the operator core network 106. Accordingly, communication with UE 110 may be established via the non-3GPP Interworking Function (N3IWF) 238. For example, in some embodiments, a UE 110 may authenticate with a WAP 320 to establish a communications link with the customer premise network 303. The non-3GPP network 303 may be couple to, and authenticated with, the N3IWF 238 of the operator core network 106. An IPsec user plane tunnel and/or IPsec control plane tunnel may be created to establish a secure communication link between the UE 110 and the N3IWF 238. The N3IWF 238 may be coupled to the UPF 236 by a communication link that includes an N3 user plane tunnel 308. For example, the N3 user plane tunnel 308 may connect a router or network gateway of the non-3GPP access network 304 to an N3 interface of the UPF 236. As was previously described with respect to FIG. 2, the TC data archiving function(s) 107 may be a network function coupled to the UPF 236 and receive TC data from UE 110 of non-3GPP access network 304 via the N3IWF 238 and UPF 236.

Figure 4A:
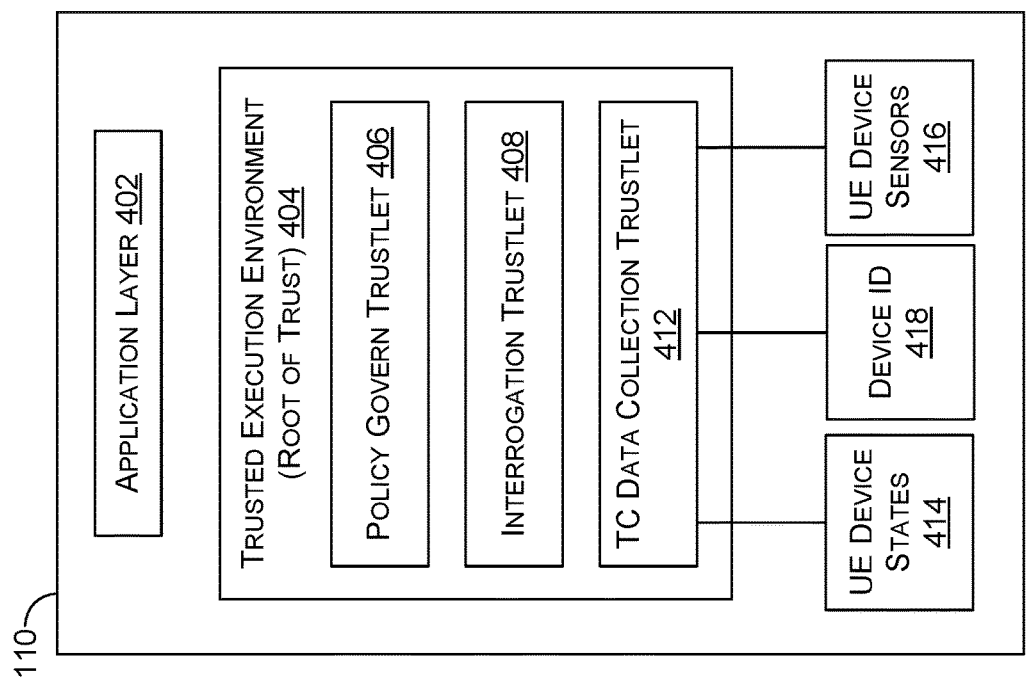
FIG. 4A is a diagram illustrating example user equipment, in accordance with some embodiments described herein.

FIG. 4A is an illustration of an example UE 110. In some embodiment UE 110 may be used to implement a controller UE 110-A that includes a controller application 112-A. In some embodiments, the UE 110 may be used to implement a remote controlled UE 110-B that includes a responder application 112-A. More generally, UE 110 comprises one or more application that selectively collect and report TC data to the TC data archiving function(s) 107 for storing to the immutable TC data archive 130. The applications 112-A and/or 112-B may be implemented at least in part by a TC data collection module (or "trustlet") 412 resident on the UE 110, protected from tempering or manipulation by a hardware Root of Trust and hosted from the Trusted Execution Environment (TEE) 404.

Although some UE's may include other systems, generally UE 110 includes at least an application layer 402 and the trusted execution environment 404. The application layer 402 facilitates execution of the UE 110 operating system and executables (including applications). In other words, the application layer 402 provides the direct user interaction environment for the UE 110. TEE 404 facilitates a secure area of the processor(s) of UE 110. That is, TEE 404 provides an environment in the UE 110 where isolated execution and confidentiality features are enforced. Example TEEs include Arm TrustZone technology, Software Guard Extensions (SGX) technology, or similar. For example, the application layer 402 of a controller UE 110-A may comprise one or more applications for receiving inputs via a user interface from a user that are used for generating commands for operating the remote controlled UE 110-B, and for receiving, processing and/or displaying telemetry or other data generated by the remote controlled UE 110-B. For example, the application layer 402 of a remote controlled UE 110-B may comprise one or more applications for operating the remote controlled UE 110-B based on commands received from the controller UE 110-A, and for sending telemetry or other data to the controller UE 110-A.

Generally, computer readable code executed in the TEE 404 is referred to as a "trustlet". A trustlet can securely access data stored memory of the UE 110 that is otherwise inaccessible in the application layer 402. A trustlet may take the form of trusted processes, secure processes, isolated user mode (IUM) processes, or the like. For example, a trustlet executed in TEE 404 can access system level data (that is, data related to the larger machine the UE 110 in incorporated within), private and/or public keys, and similar data stored, or accessed, by the UE 110. Trustlets can be activated in response to various network or UE operations. For example, a trustlet can be activated by execution of an associated application in the application layer 402. For another example, a trustlet can be activated in response to a command generated by a network (e.g., network operator core 106 of FIG. 1) and communicated to the UE 110. The trustlet(s) activated may vary depending on the service requested. For example, a first trustlet may be activated in response to a voice service. A second trustlet may be activated in response to a messaging service. A third trustlet may be activated in response to a data service that facilitates a telemetry update. Similarly, the trustlet(s) activated may vary within a particular type of service. For example, a fourth trustlet may be activated in response to a data service request that facilitates a telemetry update. Specifically with respect to the TC data archiving services provided by the TC data archiving function 107, the TC data collection trustlet 412 may be activated by the TC data archiving function 107 in response to one or both of the UE of a UE companion pair 120 activating TC data archiving services. That is, in some embodiments, when either UE of a UE companion pair 120 (either the controller UE 110-A or the remote controlled UE 110-B) initiates activation of TC data archiving services, the TC data archiving function 107 may activate the TC data collection trustlet 412 of both the controller UE 110-A and the remote controlled UE 110-B.

Upon activation, a trustlet performs a set of predetermined operations. The operations can include, but are not limited to: accessing data stored by the UE, (such as a set keys that are embedded directly into a processor or microcontroller during manufacturing, certificates of authority, unique device identifiers, or any other data); monitoring operations of the UE (such as monitoring processor load, microcontroller load, activation of other UE systems, or other similar UE operations); access or monitor operations of other applications executed by the UE; writing data to the memory of UE; activate another trustlet; or any combination thereof.

As depicted, TEE 404 illustratively may include a policy governing trustlet 406, an interrogation trustlet 408, and the TC data collection trustlet 412. Policy governing trustlet 406 corresponds to an illustrative example of computer readable code that is activated in response to execution of an application or operation. Upon activation, policy governing trustlet 406 may access a locally stored set of keys corresponding to the application and the UE's processor. Additionally, policy governing trustlet 406 may access a UE's unique device ID 418 (e.g., a permanent equipment identifier (PEI), an international mobile equipment identity (IMEI), an integrated circuit card identifier (ICCID), and/or other device ID as further discussed below). The policy governing trustlet 406 may communicate the accessed data to a communication network for analysis.

Interrogation trustlet 408 corresponds to an illustrative example of computer readable code that is activated in response to a command from the communication network. An interrogation trustlet can be activated by a command that is generated in response to a determination that UE 110 is an unknown device or that the UE provided anomalous data for a requested network service. In response to activation, an interrogation trustlet may activate other trustlets (e.g., policy governing trustlet 406, TC data collection trustlet 412, or any other trustlet), access additional data, or perform any other trustlet operation. The interrogation trustlet 408 may communicate the accessed data to a network. For example, interrogation trustlet 408 may be activated in response to a command that the network has requested data from one or more trustlets executed in the trusted execution environment. In some embodiments, the TC data collection trustlet 412 is activated by the interrogation trustlet 408 in response to a command from the TC data archiving function 107.

As previously discussed, individual UE 110 may be identified and/or authenticated with the operator core network 106 and/or the TC data archiving function(s) 107 by a device ID 418. Different forms of identification information may be used for the device ID 418. For example, in some embodiments, the device ID 418 may comprise an International Mobile Equipment Identity (IMEI) identifier. The IMEI may be stored in a subscriber identify module (SIM) card or embedded SIM (eSIM) of the UE 110 and transmitted to the operator core network 106 as part of the process to authenticate the UE 110. In some embodiments, the device ID 418 may comprise one or more elements of an integrated circuit card identifier (ICCID), a permanent equipment identifier (PEI), mobile subscriber international subscriber directory number (MSISDN), mobile subscription identification number (MSIN), International mobile subscriber identity (IMSI), mobile country codes (MCC), subscription permanent identifier (SUPI), mobile network codes (MNC), and/or other identifier. In some embodiments, the device ID 418 may comprise one of more decentralized identifiers (DIDs), such as World Wide Web Consortium (W3C) DIDs for example. In some embodiments, a device ID 418 comprises a DID that resolves to a DID document. The DID document may be stored at a data registry (e.g., a verifiable data registry). For example, a DID may include a Universal Resource Identifier (URI) that associates a UE 110 (as a DID subject) with a DID document. The DID may include, for example, cryptographic public keys that the UE 110 and/or its companion UE (of a companion UE pair 120) may use to authenticate itself with the operator core network 106 and/or the TC data archiving function(s) 107 and prove its association with the DID (e.g., the device ID 418). In some embodiments, the device ID 418 may be based on a self-sovereign identity (SSI) paradigm where the UE 110 may present its device ID 418 (and/or the device ID 418 of its companion UE of a companion UE pair 120) to the operator core network 106 and/or the TC data archiving function(s) 107, which may verify that the device ID(s) 418 were issued from a trusted issuer. In some embodiments, a device ID 418 may comprise a combination of identifiers such as any of those described herein. For example, a device ID 418 may comprise a combination of hardware identifiers, network address identifiers, serial numbers, component identifiers (e.g., CPU IDs), and/or other identifiers such a as discussed herein. In some embodiment a device ID 418 may be managed (using a dAPP, crypto wallet, or the like, for example) and verified using public-key cryptography in conjunction with a distributed ledger. For example, in some embodiment the device ID 418 for a UE 110 may be generated by back-end block chain ledger and downloaded to the UE 110. The TC data archiving function(s) 107, in some embodiments, may determine what type of TC data will be received from a UE 110 based on the device ID 418 reported by the UE 110.

TC data collection trustlet 412 corresponds to an illustrative example of computer readable code that is activated in conjunction with initiation of TC data archiving services. As such, the TC data collection trustlet 412 accesses data generated or otherwise collected by the other trustlets executed within the TEE 404, or other applications of application layer 402. For a controller UE 110-A, the TC data collection trustlet 412 may operate to report to the TC data archiving function(s) 107 commands sent by the UE 110-A (e.g., that satisfy an inflection criteria) to the UE 110-B. For remote controlled UE 110-B, the TC data collection trustlet 412 may operate to report to the TC data archiving function(s) 107 telemetry data (e.g., that satisfy an inflection criteria). The telemetry data may include, but is not limited to, measurements or other state variables representing the current operating state of the UE 110-B. The telemetry data may include measurements or other state variable representing an operating response of the remote controlled UE to the command data received from the controller UE. In some embodiments, a TC data collection trustlet 412 of a remote controlled UE 110-B may report to the TC data archiving function(s) 107 TD data that represents command received by the remote controlled UE 110-B from the controller UE 110-A. In some embodiments, a TC data collection trustlet 412 on a UE 110 may function to perform one or more of the functions described herein of TC data collection trustlets for both a controlling UE 110-A and a remote controlled UE 110-B. For example, in some embodiments, a remote controlled UE 110-B may further function as a controller UE of yet another remote controlled UE. Likewise, in some embodiments, a controller UE 110-B may in some aspects function as a remote controlled UE as controlled by yet another controller UE. Moreover, in some embodiments, such as shown with respect to FIG. 7, a TC data collection trustlet 412 executing on one of the UE 110 of a companion UE pair 120 may collect both command and telemetry data for the pair, and report that command and telemetry data as TC data to the TC data archiving function(s) 107 on behalf of both UE 110 of the companion UE pair 120. In such embodiments, the TC data collection trustlet 412 may report the TC data to the TC data archiving function(s) 107 using the device IDs 418 for both EU 110 of the companion UE pair 120 and/or a device ID assigned to the companion UE pair 120, as discussed below with respect to FIG. 5A.

The TC data collection trustlet 412 may communicate with other trustlets of the TEE 404 in performance of its activities described herein. For example, the TC data collection trustlet 412 may optionally be activated by the interrogation trustlet 408 in response to a command from the TC data archiving function 107. In other embodiments, the TC data collection trustlet 412 may be activated by the TC data archiving function 107 without involvement of the interrogation trustlet 408. The TC data collection trustlet 412 may query and/or receive information from the UE device states 414, Device ID 418, and/or measurements from UE device sensors 416 (such as command related data and/or UE telemetry data) for compiling TC data to report to the TC data archiving function(s) 107. In some embodiments, the TC data collection trustlet 412 may query and/or receive information at least some TC data information by interacting with one or more other trustlets.

As discussed in greater detail below with respect to FIGS. 5A and 5B, TC data compiled by the TC data collection trustlet 412 may be reported to the TC data archiving function 107 as a sequence of session blocks. For example, session blocks may be sequenced onto a chain, such as a distributed ledger or block-chain to form a ledger archive. The session blocks may be communicated to the TC data archiving function 107 sequentially in real time, or alternately stored locally and then sent in batch (for example, to account for a period where a real time uplink to the TC data archiving function 107 was not available).

In some embodiments, the TC data collection trustlet 412 applies an inflection criteria to determine which TC data is reporting to the TC data archiving function 107. The inflection criterial may be based on factors such, but not limited to, a change in telemetry data by more than a threshold, a predefined set of commands, a predefined set of conditions, a predefined set of events, and/or a command to change an operating parameter by more than a threshold. The inflection criterial may be dynamically adaptive. For example, the inflection criteria may be adjusted based on an operating condition of a UE 110. An inflection threshold that defines the magnitude of change that would trigger reporting telemetry data may be dynamically adjusted by the TC data collection trustlet 412 based on factors such as, but not limited to, the speed of travel of a UE 110, a positing of the UE 110 and/or a mode of operation of the UE 110. Adjustments to inflection criteria/thresholds may be determined based on sensor data, such as temperature measurements, humidity measurements, or other environmental conditions. The TC data collection trustlet 412 may select TC data that includes command data such as, but not limited to, instructions for performing operations on a remote controlled UE 110-B such as maneuvering, navigating, controlling actuators, motors, electronics and/or other components. The TC data collection trustlet 412 may select TC data that includes telemetry data such as, not limited to, measurements or other state variable representing the current operating state of a remote controlled UE 110-B. The telemetry data may include measurements or other state variable representing an operating response of the remote controlled UE to the command data received from the controller UE.

Figure 4B:
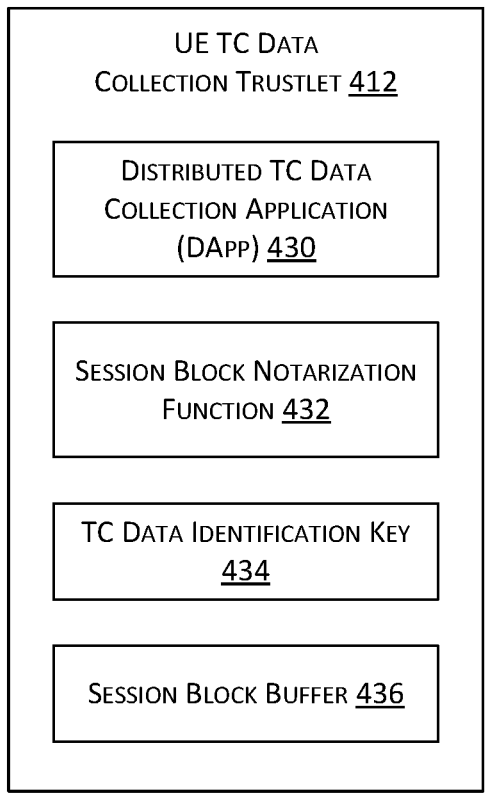
FIG. 4B is a diagram illustrating a user equipment telemetry-command data collection trustlet of a trusted execution environment, in accordance with some embodiments described herein.

One example architecture of a TC data collection trustlet 412 is shown in FIG. 4B. Here, the computer readable code that is activated comprises a distributed TC data collection application (DApp) 430, and may also include one or more of a session block notarization function 432, a TC data identification key 434, and a session block buffer 436. It should be appreciated that various alternate implementations may omit one or more of these elements.

A distributed application, such as DApp 430, comprises a top-tier definition for an application programmable interface (API) that is coded specifically to control a block-chain or distributed ledger instance and, in some implementations, are embedded directly into the blocks themselves (to form what is referred to as a smart contract (SC)). In some embodiments, TC data is reported back to the TC data archiving function 107 as session blocks generated by the DApp 430. The TC data archiving function 107 assembles the session blocks received from the DApp 430 into a sequence for recordation as the immutable TC data archive 130.

When a distributed application, such as DApp 430, is implemented as a smart contract, there can be as many stipulations as needed programmed into the smart contract to satisfy the participants (i.e., the wireless network provider and/or the UE owner/operator) that the TC data is gathered with integrity. For example, a preprogramed smart contract may establish terms upon which the data elements of TC data will determine how transactions and data are represented on a block-chain or ledger produced by the TC data archiving function 107. Such a smart contract utilizes "if/ when ... then ... " rules that govern the data indicators and to explore possible exceptions that might affect the fidelity of the collected TC data and its viability as trusted data. In some implementations, exceptions are delegated to a reference chain that contains variations of programming that differ from the priority smart contract program. In some embodiments, a data share location where the collected TC data can be securely stored may be defined by the TC data collection trustlet 412 and/or by the TC data archiving function 107.

Generally, the DApp 430 is placed behind a hardware Root of Trust (e.g., within the TEE 404), providing for total attestation of the TC data placed into session blocks by the DApp 430 and uplinked to the TC data archiving function 107 in the network operator core 106. The wireless network operator (e.g., the service carrier) may hold the certificates of authority that created any associated secure area (e.g., TrustZone) and those certificates may be stored in a protected space. For example, a TC data identification key 434 may be comprised within the TC data collection trustlet 412, or within the DApp 430 itself, that authenticates trust in the TC data collection trustlet 412 to the TC data archiving function 107. If the UE 110 does not support a TEE 404 or other hardware root of trust mechanism, then the DApp 430 may instead be implemented in the rich environment (RE) of the UE 110 and utilize a software trust mechanism. For example, the TC data archiving function 107 may rely on a software root of trust where authentication of the UE 110 (e.g., the UE device ID 418) via standard network access authentication processes are utilized in combination with digital notarization stamps on received data (discussed below), and/or generating a distinct hash identity for each session of collected TC data.

In some embodiments, a session block notarization function 432 generates a form of self-attestation that data blocks received by the TC data archiving function 107 were indeed generated by a trusted DApp 430. That is, the session block notarization function 432 may stamp session blocks created by the DApp 430 certifying that the DApp 430 is itself certified software that is accurate and free from unauthorized modification or tampering. For example, the notarization stamp may comprise a digital signature (such as but not limited to a public key, a hash of an identification code associated with the DApp 430, or similar authentication) applied to the session blocks. The notarization stamp may be incorporated into the genesis block of each session block sequence and each time a new block of TC data is placed by the DApp 430, that stamp is embedded within it. When the block sequence is subsequently terminated by the TC data archiving function 107, that notarization stamp may be present on the genesis block, the terminal block, and each block in between. An absence of the notarization stamp may be indicative of a disruption in the process of archiving TC data such that the data of a ledger archive comprising such blocks cannot be validated as true.

The session block buffer 436 provides a local secure memory where collected TC data and/or session blocks are stored for periods of time where connectivity between a UE 110 and network operator core 106 may be interrupted. When connectivity is restored, the UE 110 can provide from this buffer 436 a record of TC data for the elapsed time where connectivity was down. The notary stamp applied to each block may contain selected validators that prove provenance that thus serves as a certification of truth of the DApp 430. In some embodiments, an imprint of the UE notarization stamp may be transmitted along with the data (e.g., and included blocks established by the DApp 430), and exist in at least the last block of the ledger archive chains stored to the immutable TC data archive 130, signifying that the stored ledger archive includes only original and unaltered TC data.

Figure 5A:
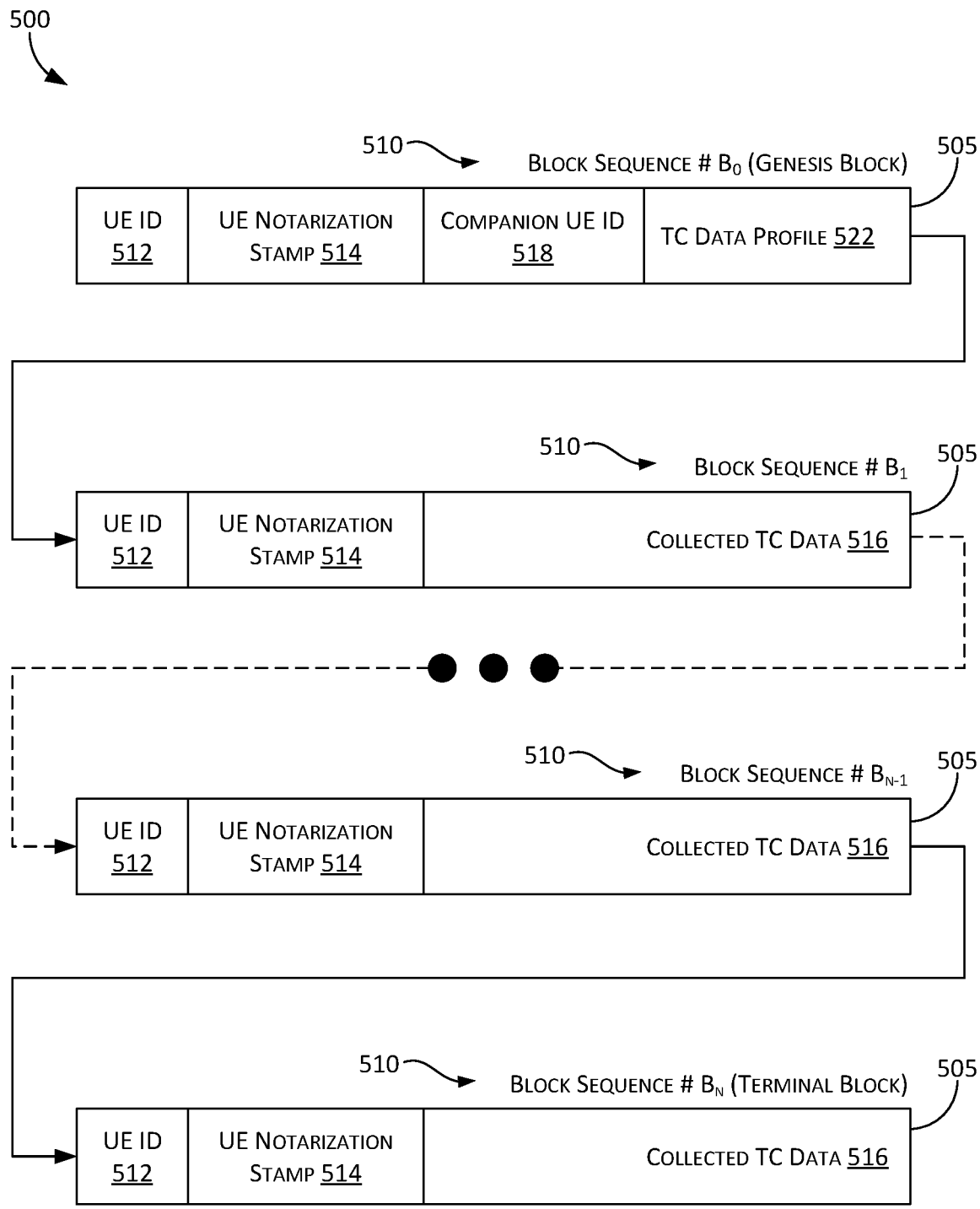
FIGS. 5A and 5B are diagrams illustrating example telemetry-command data session block sequences, in accordance with some embodiments described herein.
Figure 5B:
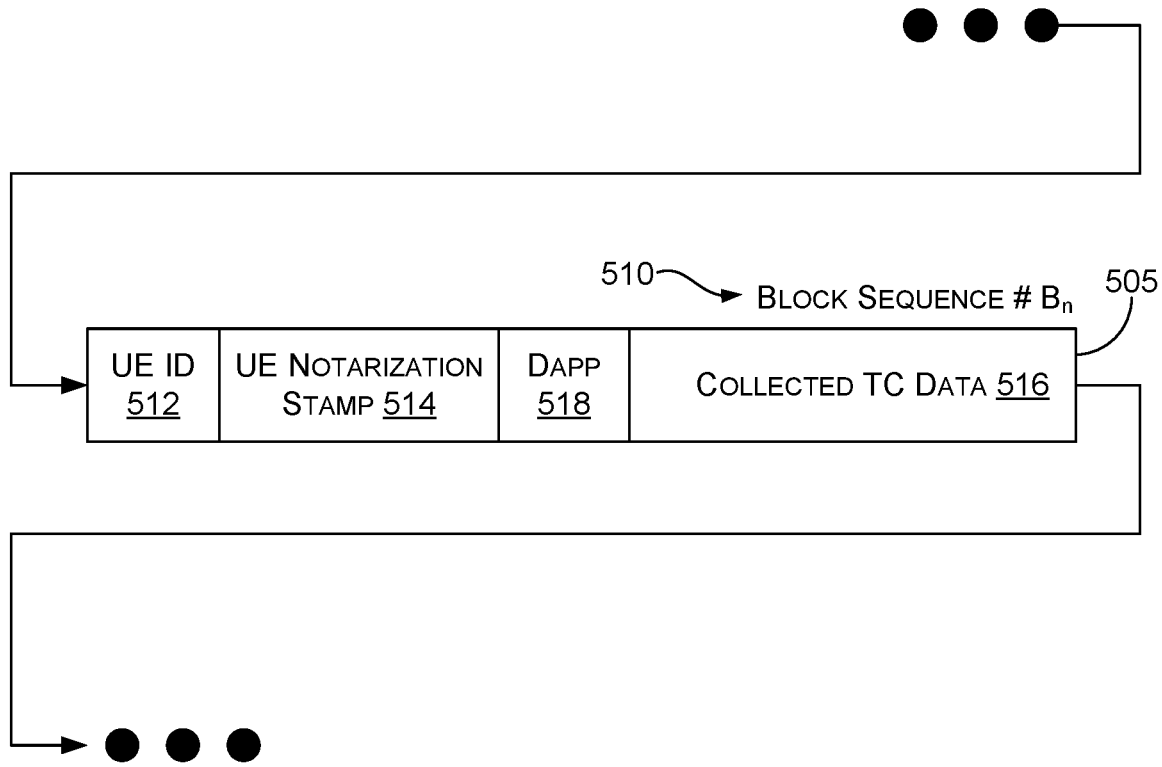

FIG. 5A is a diagram illustrating a session block sequence 500 for communicating TC data collected by the DApp 430. A session block sequence 500 comprises a sequence of session blocks 505, each block 505 associated with a snapshot of TC data captured by the DApp 430 at a point in time. Each block 505 includes a block sequence number 510, a UE ID 512 that includes a unique identification code of the UE 110 (such as the UE device ID 418, for example), a UE notarization stamp 514 embedded into the block 505 by the session block notarization function 432, and collected TC data 516. If the block 505 comprises part of a smart contract, then implementing code associated with the DApp 430 may also be included within a block 505 as illustrated in FIG. 5B at 518.

The first block 505 of the session block sequence 500 is referred to as the "genesis block" of that session block sequence 500 and represents the initial block of the sequence generated by the DApp 430. The specific structure of the genesis block and each other block of a session block sequence 500 may be defined by the DApp 430. In some embodiments, each subsequent block of the sequence 500 may follow the structure of its genesis block. In some embodiment, a payload of the genesis block may include a companion UE ID 520 that comprises the UE ID (for example, a device ID 418) associated with the companion UE of the UE 110 that generated the session block sequence 500. For example, if the session block sequence 500 is generated by a DApp 430 executed on the controller UE 110-A, then the companion UE ID 520 may indicate the UE device ID of the remote controlled UE 110-B that forms a companion UE pair 120 with controller UE 110-A. Similarly, if the session block sequence 500 is generated by a DApp 430 executed on the remote controlled UE 110-B, then the companion UE ID 520 may indicate the UE device ID of the controller UE 110-A that forms a companion UE pair 120 with controller UE 110-B. In this manner, a session block sequence 500 carrying TC data generated by a controller UE 110-A can be linked or associated (e.g., within the immutable TC data archive 130) with a session block sequence 500 carrying TC data generated by a remote controlled UE 110-B. In some embodiments, the TC data archiving function 107 may use the companion UE ID 520 field of a session block sequence 500 to fuse a session block sequence 500 of a controller UE 110-A with a session block sequence 500 of a remote controlled UE 110-B for storage as a single (or hybrid) ledger archive within the immutable TC data archive 130. As such, the immutable TC data archive 130 may further immutably record which controller UE was paired with which remote controlled UE for the session of TC data captured by that ledger archive. In some embodiments, the UE ID and/or companion UE ID 520 may include a device ID assigned to the 120 companion UE pair 120.

In some embodiments, the genesis block of a session block sequence 500 may comprise a TC data profile 522 indicating the type of TC data that is being recorded in the session block sequence 500 by the DApp 430. The DApp 430 may be programed to collect and report TC data 516 in a session block sequence 500 based on, for example, TC data that is designated as relevant with respect to the specific UE companion pair 120 being monitored and/or based on inflection criteria. The TC data 516 selected for inclusion in the session block sequence 500 may be selectively captured by the DApp 430 as a subset of the TC data communicated between a controller UE 110-A and its companion remote controlled UE 110-B. The selection of TC data 516 may be tailored based on the mission and/or purpose of the remote controlled UE. For example, the type of TC data 516 included in a session block sequence 500 for a remote controlled aerial drone may comprise a different type of TC data than would be collected for a remote piloted automobile.

In some embodiments, the type of data collected to serve as TC data 516 (e.g., based on satisfying the inflection criteria) may be determined from considerations such as, but not limited to, the device type of the UE, specific automated functions performed by the UE, a stage of UE operation, and/or the type or service level (for example, the network slice) being offered to that UE by the wireless communications network. For example TC data 516 selected for inclusion in session block sequence 500 may be based on the device type of the UE (whether a cell phone, tablet, automobile, train, boat, aircraft, robot, electronics equipment, or other vehicle or mechanized machinery, for example) and/or specific automated functions performed by the UE (vehicle navigation, passenger or cargo transport, building automation, electrical switching, or other form of actuator operation, for example). The type of data selected by the DApp 430 to form the collected TC data 516 may also be based on factors such as the wireless service type or service level being offered to that UE by the wireless communications network. For example, whether a UE 110 is operating on an Enhanced Mobile Broadband (eMBB) 5G network slice, a Massive Machine Type Communications (MMTC) 5G network slice, an Ultra-Reliable Low Latency Communication (URLLC) 5G network slice, or a Public Safety (PS) 5G network slice, may be considered by the DApp 430 in determining what data should be monitored at the UE 110 and stored into the collected TC data 516 of each block 505.

As shown in FIG. 5A, the final block 505 of a session block sequence 500 may be referred to as the "Terminal Block" and indicates the completion of TC data collection for a given session between the UE 110-A and UE 110-B. Reception of the terminal block by the TC data archiving function(s) 107 triggers the closing of the chain for the ledger archive for the UE monitoring session and its storage to the immutable TC data archive 130.

As used herein the term "session" refers to the collection of TC data over a period of time, and may be associated with a predefined activity, task and/or mission specific to the UE companion pair 120. A session may encompass a predetermined period of time, or be defined using different criteria.

For example, for a remote controlled UE 110-B comprising a semi-autonomous remote piloted vehicle, a session may include the collection of TC data from the time that the UE 110-B is activated and/or connects to the network operator core 106 until the time that it reaches a destination and/or disconnects from the network operator core 106. At the completion of a session, the Telemetry-Command data archiving function(s) 107 may receive the terminal block, close the ledger archive for that session, and store the closed ledger archive to the immutable TC data archive 130. Other UE 110-B may similarly define sessions on a trip-by-trip basis. Alternatively, as another example, a UE 110-B may instead comprise a contracted vehicle, where the session duration is intended to coincide with the duration or other terms of the contract agreement. In other implementations, such as for industrial equipment, a session may corresponds to a duration or count of operation cycles. Regardless of the specific mission of the remote controlled UE 110-B, the duration of a session may be determined based on a criteria programed into the DApp 430, and thus may be distinctly established for individual UE 110. Other examples of criteria for establishing when a session can be closed includes criteria such as, but not limited to, subscription terms, UE 110 device type, specific automated functions performed by the UE 110, or any of the other criteria discuss herein that characterizes a mission of the UE 110.

As previously mentioned, in some embodiments, a session block buffer 436 provides a local secure memory where collected TC data and/or session blocks may be stored for periods of time where connectivity between a UE 110 and a network operator core 106 is interrupted. Interruptions may involve temporary events (such as due to the UE traveling through a zone with no coverage, or atmospheric or RF interference, for example), or long term/permanent interruptions (such as due to a major UE 110 equipment anomaly or disabling event, for example). For long term interruptions, the TC data archiving function(s) 107 may be programmed with one or more time-out functions that begin to count the time elapsed since the last block 505 was received from the UE 110. For example, the TC data archiving function(s) 107 may unilaterally terminate the UE monitoring session with the UE 110 when the time-out function reaches a predefined limit, define the last received block 505 as the terminal block, close the ledger archive for that UE monitoring session, and store the closed ledger archive to the immutable TC data archive 130. When the UE 110 commences a new mission, a new UE monitoring session is created, generating new blocks on a new chain that will be stored as a new ledger archive to the immutable TC data archive 130 upon completion of that new mission.

In other instances, for example, when a disruption is brief or momentary, the TC data archiving function(s) 107 may maintain the UE monitoring session as open, and continue appending new blocks received to the sequence after connectivity with the UE 110 is restored. The TC data archiving function(s) 107 may receive and append omitted blocks 505 that were produced by a TC data collection trustlet 412 during the temporary interruption. For example, the TC data collection trustlet 412 may report omitted block of TD data generated by the DApp 430 and stored to the session block buffer 436. For example, should an incident occur with the UE 110 during a connectivity interruption, the blocks 505 collected during the interruption and stored to the session block buffer 436 may include TC data collected during and/or just before the time of the incident. Upon reconnection, the TC data archiving function(s) 107 may receive the buffered blocks 505. The TC data archiving function(s) 107 may and utilize the block sequence numbers 510 to appropriately place those blocks between the previously received blocks and newly received blocks, thus preserving continuity in the chain of TC data collected for that session.

Figure 6:
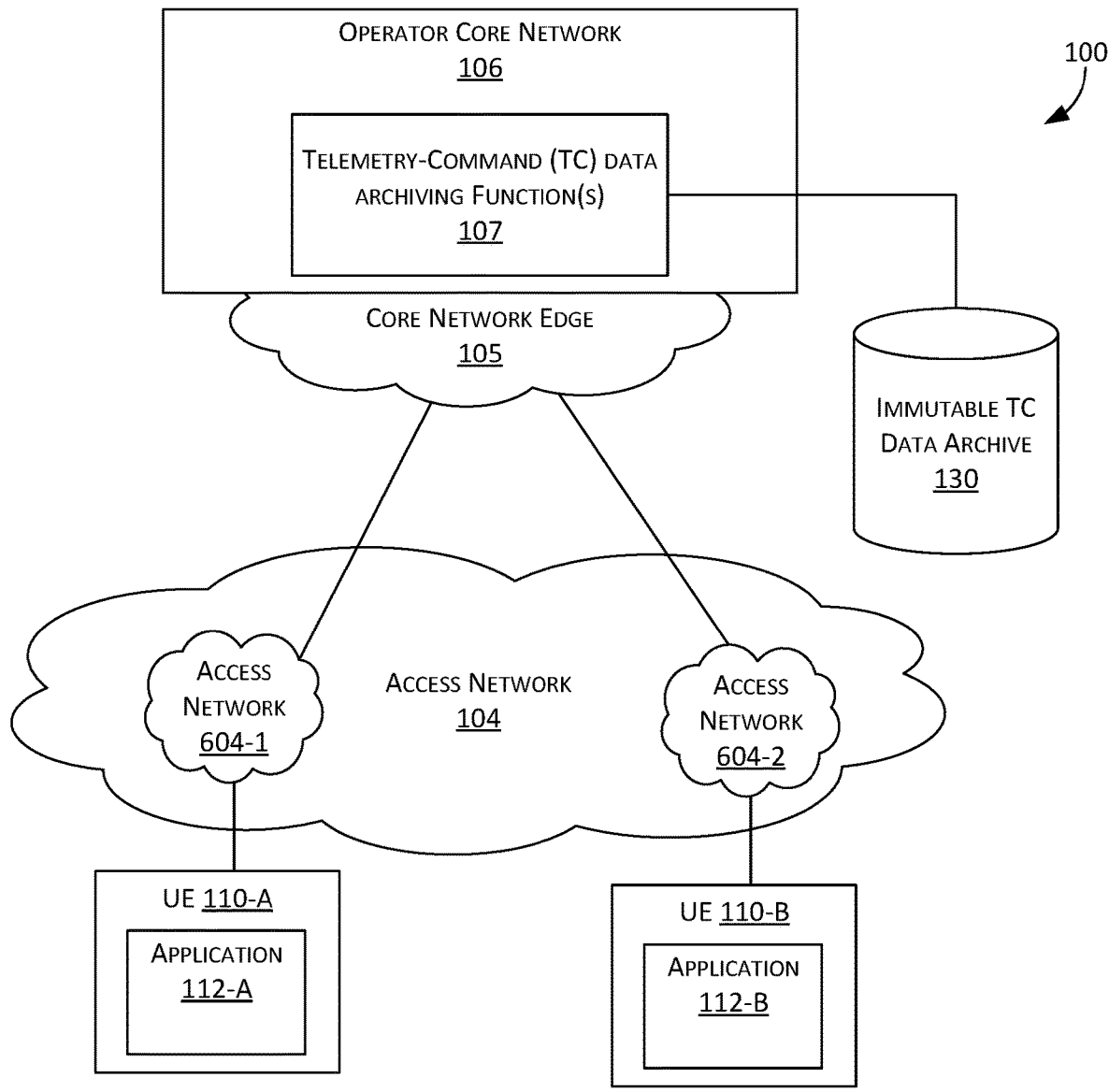
FIG. 6 is a diagram illustrating an example access network configuration for a network environment, in accordance with some embodiments described herein.

Referring now to FIG. 6, FIG. 6 illustrates example configuration options for a network environment 100 implementing TC data archiving service over a wireless communications system such as any of the embodiments described herein. As shown in FIG. 6, the access network 104 may comprises a plurality of access networks (e.g., 604-1 and 604-2), each coupled to the core network 106 and through which the TC data archiving service from the TC data archiving function(s) 107 is available. For example, a controller UE 110-A of a UE companion pair 120 may be coupled to a first access network 604-1 while the companion controlled US 110-B of that UE companion pair 120 may be coupled to a second, different, access network 604-2. TD data may thus be communicated between the UE of the UE companion pair 120 via a path through the access network 604-1, operator core network 106, and access network 604-2. Access networks 604-1 and 604-2 may individually comprise distinct RANs such as RAN 204 discussed in FIG. 2. Access networks 604-1 and 604-2 may individually comprise distinct non-3GPP access networks, such as the non-3GPP network 303 discussed in FIG. 3. In some embodiments, the access networks 604-1 and 604-2 may include a combination of 3GPP RAN and non-3GPP access networks. For example, access network 604-1 may comprise a RAN while access network 604-2 comprises a non-3GPP access network, or access network 604-1 may comprise a non-3GPP access network while access network 604-2 comprises a RAN. In any of these configurations, the respective UE 110 may respectively collect and report TC data to the TC data archiving function(s) 107 as described by any of the embodiments herein.

Figure 7:
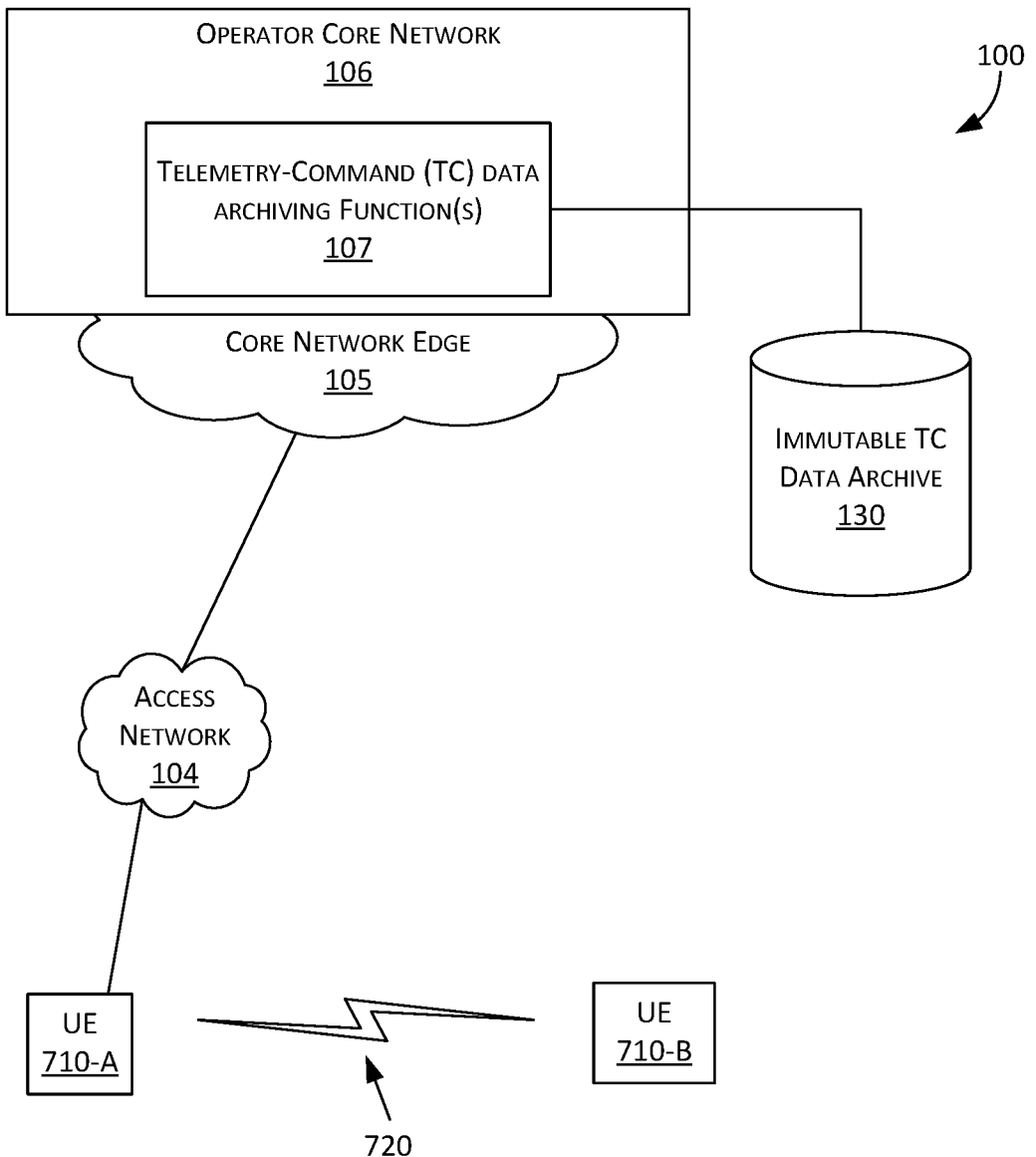
FIG. 7 is a diagram illustrating an another example access network configuration for a network environment, in accordance with some embodiments described herein.

Referring now to FIG. 7, FIG. 7 illustrates example configuration options for a network environment 100 implementing TC data archiving service over a wireless communications system such as any of the embodiments described herein. In this embodiments, the UE 110 of companion UE pair 120 include a first UE (shown as UE 710-A) and a second UE (shown as UE 710-B). As shown in FIG. 7, in this example embodiment, the UE 710-A is coupled to the access network 104. The UE 710-B establishes an RF wireless communication link 720 (e.g., a point-to-point wireless communication link) to the UE 710-A for the purpose of exchanging TC data between the UE 710-A and the UE 710-B. In such an embodiment, the UE 710-A may comprise the controller UE 110-A while the UE 710-B comprises the remote controlled UE 110-B. Alternatively, the UE 710-A may comprise the remote controlled UE 110-A while the UE 710-B comprises the controller UE 110-A. In either configuration, the UE 710-A may collect and report TC data to the TC data archiving function(s) 107 on behalf of both the UE 710-A and the UE 710-B as described herein. For example, in an implementation where the UE 710-A is operating as the controller UE 110-A and the UE 710-B is operating as the remote controlled UE 110-B, the UE 710-A may send command TC data to the UE 710-B via the RF wireless communication link 720, and receive telemetry TC data from the UE 710-B via the RF wireless communication link 720. The TC data collection trustlet 412 of the UE 710-A may generate a session block sequence 500 that include as TC data 516 the TC data (e.g., command data) that it generates in addition to the TC data (e.g., telemetry data) received from the UE 710-A. In another implementation where the UE 710-A is operating as the remote controlled UE 110-B and the UE 710-B is operating as the controller UE 110-A, the UE 710-A may send telemetry TC data to the UE 710-B via the RF wireless communication link 720, and receive command TC data from the UE 710-B via the RF wireless communication link 720. The TC data collection trustlet 412 of the UE 710-A may generate a session block sequence 500 that include as TC data 516 the TC data (e.g., telemetry data) that it generates in addition to the TC data (e.g., command data) received from the UE 710-B. The session block sequence 500 may identify the device ID of the UE 710-A (for example, as UE ID 512) and the device ID of the UE 710-B (for example, as companion UE ID 520). In some such embodiments, the UE 710-A may perform one or more authentication processes on behalf of UE 710-B to authenticate the trustworthiness of TC data received by UE 710-B (e.g., by authenticating the TC data collection trustlet 412 and/or the DApp 430 of UE 710-B with TC data archiving function(s) 107).

Figure 8:
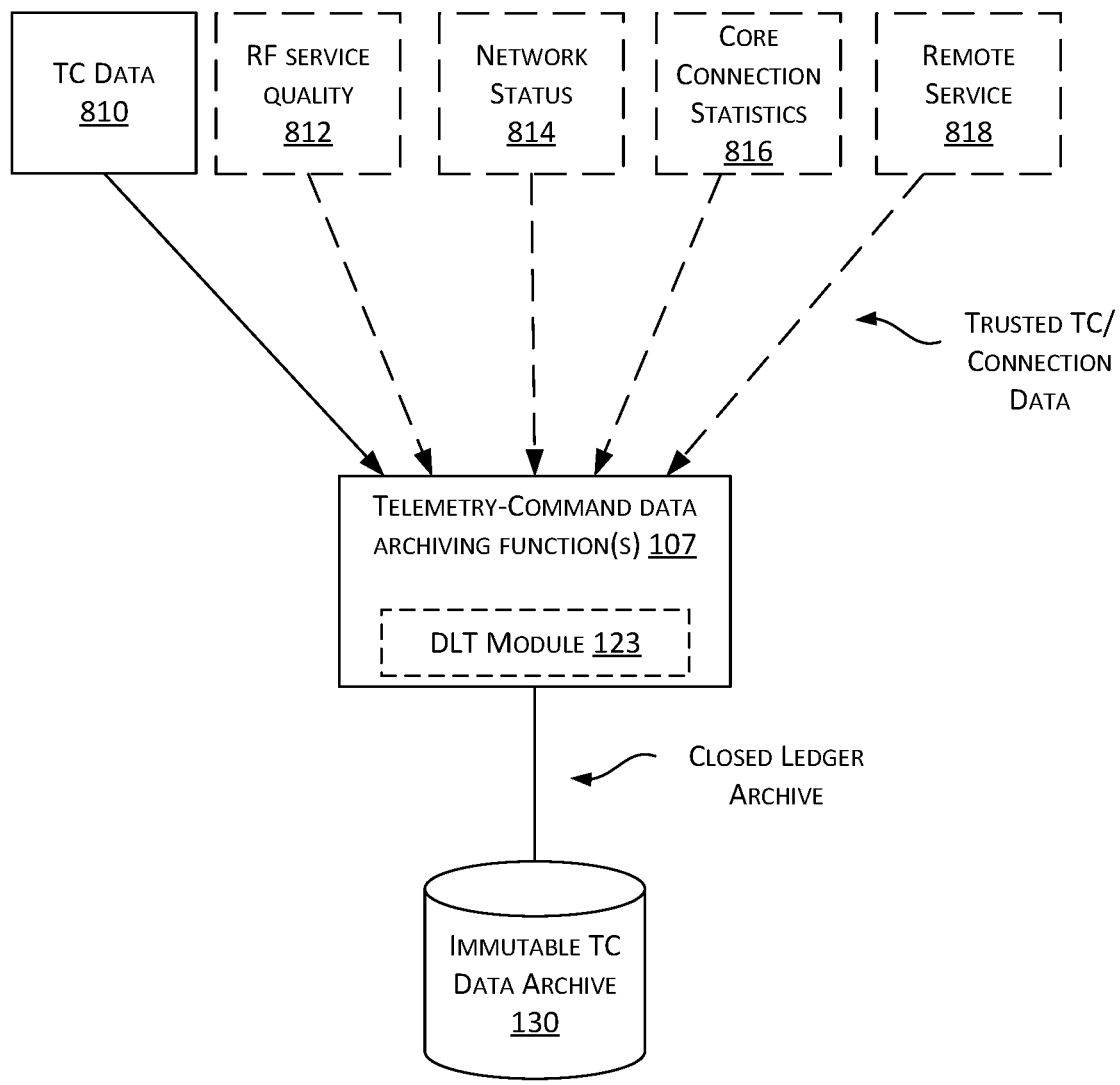
FIG. 8 is a diagram illustrating an example embodiment for collecting telemetry-command data and/or connection data from across a network, in accordance with some embodiments described herein.

Referring now to FIG. 8, FIG. 8 illustrates example embodiment for collecting TC data associated with a UE companion pair 120, in accordance with some embodiments described herein. As shown in FIG. 8, the TC data archiving function(s) 107 can receive trusted TC data (shown at 810) from the UE 110 of an operating UE companion pair 120, but in some embodiments may also receive network status data (which may be referred to as "connection data") from one or more sources. This network status data may be compiled or otherwise combined with the session block sequences 500 of TC data 810 and stored to the immutable TC data archive 130. For example, in some embodiments, the TC data archiving function(s) 107 may receive operator core witness data and/or connection data such as described in U.S. patent application Ser. No. 17/560,709, titled "SYSTEMS AND METHODS FOR IMMUTABLE ARCHIVING OF USER EQUIPMENT CONNECTION DATA FOR WIRELESS COMMUNICATIONS NETWORKS", filed on Dec. 23, 2021, which is incorporated by reference in its entirety.

For example, the TC data archiving function(s) 107 may receive downlink RF service quality related data 812 (e.g., captured by the DApp 430). The RF service quality related data 812 can include cell or base station ID information for cells to which the UE is connected to or can otherwise observe, indications of signal strength, interference, or other physical layer information captured by the UE 110. The TC data archiving function(s) 107 may receive one or more of information about the operation of the access network 104 itself (shown at 814), such as cell loading information, cell percent utilization, received uplink signal interference, SNR, SINR, and other RF signal quality metrics concerning the RF environment of the access network's coverage area. The TC data archiving function(s) 107 may receive trusted connection data 816 from the OSS 252 regarding core network connection statistics such as average latency, packet drop rates, the number of active connections and other network statistics monitored by the core's OSS 252. The TC data archiving function(s) 107 may receive trusted connection data 818 received from a remote service that provides data communicated to the UE 110. For example, in some embodiments, a UE 110 may receive global navigation satellite system (GNSS) correction signals generated by the access network 104. For example, in some embodiments, the access network 104 may generate real-time kinematic positioning (RTK) signals based on a navigation satellite signal's carrier wave as observed by a GNSS receiver at the access network 104. The UE 110 may compare the navigation satellite signal's carrier phase as indicated by the RTK signal with its own measurements of the carrier phase of the navigation satellite's signal to compute a correction to its own position estimation. In some embodiments, the RTK signal may represent a remote service that provides data communicated to the UE 110, and the TC data archiving function(s) 107 may receive trusted connection data 818 (and/or other data) pertaining to the RTK signal provided to a UE 110 and include connection data relevant to that service for inclusion in the immutable TC data archive 130.

In some embodiments, the TC data archiving function(s) 107 functions as the aggregator and arbitrator of the TC data and connection data it receives from various sources, verifying that the data is trustworthy and/or from a trustworthy source.

Once received TC and/or connection data is verified, it may be added to a block of the ledger archive up until the current session is completed. At that point, the TC data archiving function(s) 107 may close the chain of the ledger archive, saving it as a closed ledger archive to the immutable TC data archive 130.

Figure 9:
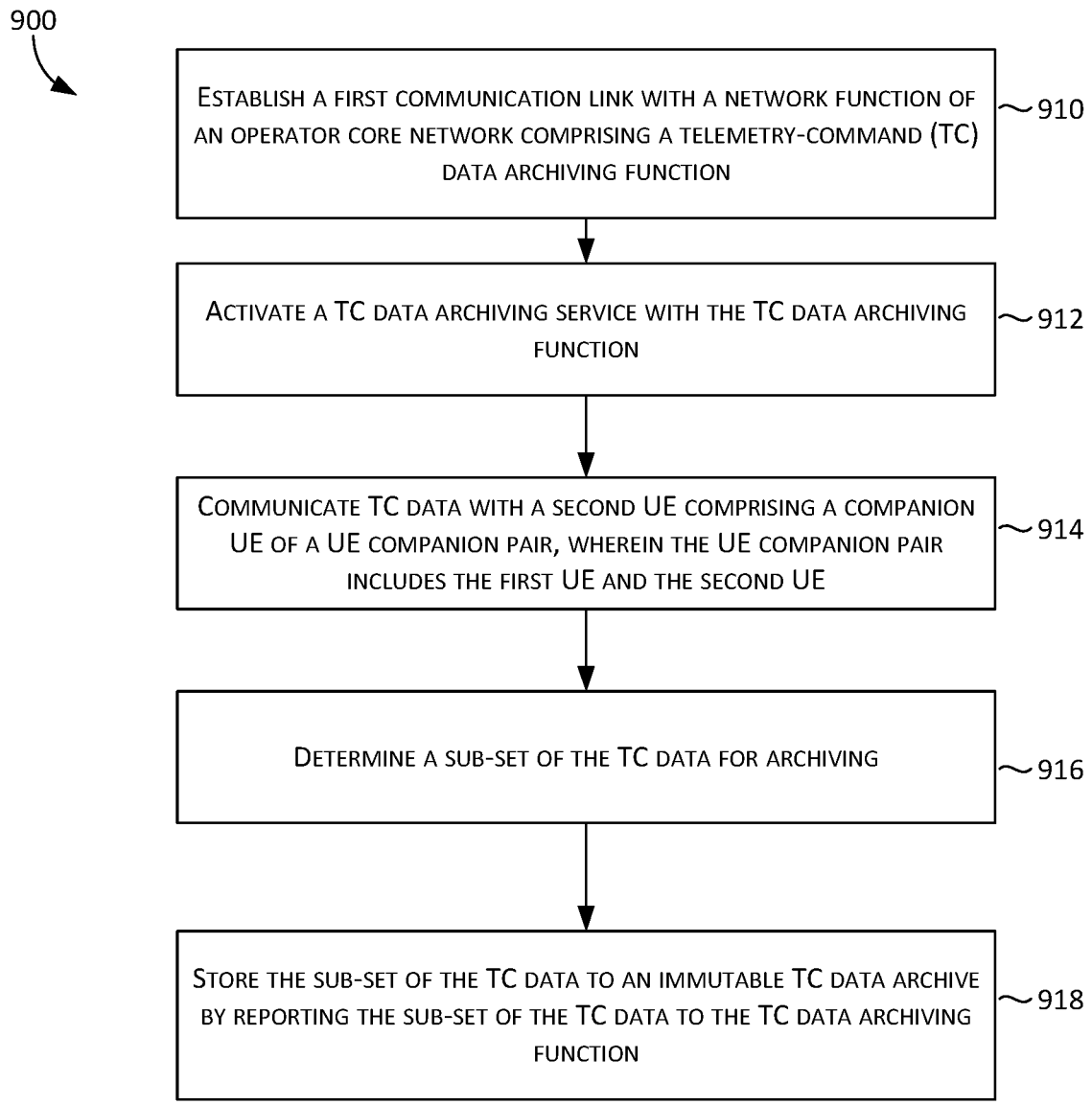
FIG. 9 is a flow chart illustrating an example method for collecting and archiving telemetry-command data, in accordance with some embodiments described herein.

FIG. 9 is a flow chart illustrating a method 900 for implementing TC data archiving services over a wireless communications system, according to some embodiment. It should be understood that the features and elements described herein with respect to the method of FIG. 9 may be used in conjunction with, in combination with, or substituted for elements of, any of the other embodiments discussed herein and vice versa. Further, it should be understood that the functions, structures, and other descriptions of elements for embodiments described in FIG. 9 may apply to like or similarly named or described elements across any of the figured and/or embodiments described herein and vice versa. In some embodiments, elements of method 900 are implemented utilizing UE 110, TC data archiving function(s) 107 and/or other components of the network environment 100 as disclosed above. For example, one or more non-transient computer-readable media may store computer-usable instructions that, when executed by the one or more processors, cause the one or more processors to perform the method.

The method 900 at 910 includes establishing a first communication link with a network function of an operator core network comprising a telemetry-command data archiving function. The first communication link may be established between a first UE and the telemetry-command data archiving function via an access network coupled to the operator core network. As illustrated in FIGS. 1, 2 and 3, the operator core network may include, the telemetry-command data archiving function, among the other network functions further discussed herein. In some embodiments, the operator core network is a component of a network environment that comprises, at least in part, a wireless communications network. For example the network environment may comprise one or more access networks, comprising one or more an eNodeB, a gNodeB, a non-3GPP network, one or more wireless access points (APs) such as, but not limited to, IEEE 802.11 (WiFi), and/or IEEE 802.15 (Bluetooth) access points. The access network may comprise a multi-modal network (for example comprising one or more multi-modal access devices) where multiple radios supporting different systems are integrated into the access network. Such a multi-modal access network may support a combination of 3GPP radio technologies (e.g., 4G, 5G, and/or 6G) and/or non-3GPP radio technologies. In some embodiment, the access network may comprise a terrestrial wireless communications base station and/or may be at least in part implemented as an space-based access network (e.g., comprising a space-based wireless communications base station). Individual UE may communicate with the operator core network via the access network over one or both of uplink (UL) radio frequency (RF) signals and downlink (DL) radio frequency (RF) signals. The method 900 at 912 includes activating a telemetry-command (TC) data archiving service with the telemetry-command data archiving function. For example, the first UE may subscribe for TC data archiving services provided by the TC data archiving function (as discussed herein) to intelligently capture an immutable archive of TC data communicated between the first UE and the second UE. In some embodiments, activating the TC data archiving service may include authenticating one or both of the first UE and the second UE, for example using a device identifier (ID). The method 900 at 914 includes communicating TC data with a second UE comprising a companion UE of a UE companion pair, wherein the UE companion pair includes the first UE and the second UE. In some embodiments, the TC data is communicated through a communications network using functions of the operator core network. In other embodiments, the TC data may be communication by a point-to-point RF wireless link between the first UE and the second UE. The TC data may include, for example, command data generated by a controller UE that is used to control the operation of a remote controlled UE. The TC data may include telemetry data generated by the remote controlled UE.

The method 900 at 916 includes determining a sub-set of the TC data for archiving. For example, the set of TC data selected for archiving may comprises a sub-set of the TC data communicated between the first and second UE. In some embodiments, the method may apply an inflection criteria to determine which TC data is archived, and which is not. As described herein, an inflection criteria may refer to a predefined set of conditions, events, or actions, which are defined as representing inflection points where a significant change occurs. For example, inflection criteria may define that a navigation correction, or change in path or speed, exceeding an established threshold represents an inflection point. Commands that operate certain components of the remote controlled UE may be predefined as inflection points per the inflection criteria. For example, turning on an in-cabin convenience light may not be classified as an inflection point while turning on headlamps or other exterior lighting may be classified as an inflection point. In some embodiments, the method may apply an inflection criteria to determine which telemetry data is archived, and which is not. An inflection criteria may refer to a predefined set of conditions, events, or actions that are defined as representing inflection points where a significant change occurs. For example, the inflection criteria may define that telemetry data reported at TC data to the TC data archiving function 107 include changes to measurements or other state variables representing an operating response of the remote controlled UE to command data received from the controller UE. The inflection criteria may define an inflection threshold that defines the magnitude of change that would trigger reporting the telemetry data. In some embodiments, the operation of certain predefined components, alarm conditions, and/or sensor measurement crossing an inflection threshold, may comprise inflection points reported to the TC data archiving function 107 (e.g., even when they do not directly occur in response to command data from the controller UE). For example, the occurrence of a component high-temperature alarm, or low-battery alarm, may be classified as an inflection points and therefore an event reported as TC data to the TC data archiving function 107. In some embodiments, telemetry data may be used to adaptively adjust the inflection criteria used for reporting TC data. The method 900 at 918 includes storing the sub-set of the TC data to an immutable TC data archive by reporting the sub-set of the TC data to the telemetry-command data archiving function. In some embodiments, the method includes generating a session block sequence using a distributed application (DApp), where the sub-set of the TC data is reported to the TC data archiving function using the session block sequence. The immutable TC data archive may comprise, for example, at least one of a distributed ledger technology (DLT), a Hyperledger technology, or a block-chain technology.

Figure 10:
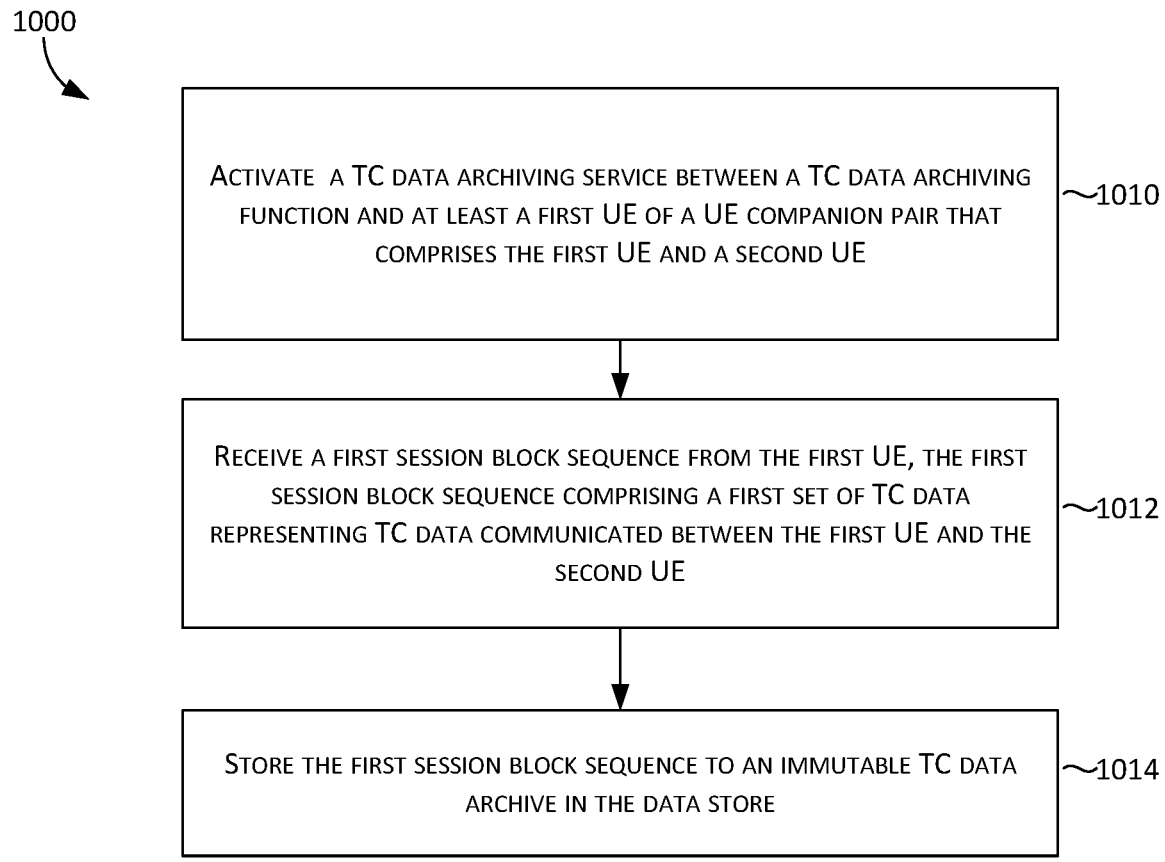
FIG. 10 is a flow chart illustrating an example method for collecting and archiving telemetry-command data, in accordance with some embodiments described herein.

FIG. 10 is a flow chart illustrating a method 1000 for implementing TC data archiving services over a wireless communications system, according to some embodiment. It should be understood that the features and elements described herein with respect to the method of FIG. 10 may be used in conjunction with, in combination with, or substituted for elements of, any of the other embodiments discussed herein and vice versa. Further, it should be understood that the functions, structures, and other descriptions of elements for embodiments described in FIG. 10 may apply to like or similarly named or described elements across any of the figured and/or embodiments described herein and vice versa. In some embodiments, elements of method 1000 are implemented utilizing UE 110, TC data archiving function(s) 107 and/or other components of the network environment 100 as disclosed above. For example, one or more non-transient computer-readable media may store computer-usable instructions that, when executed by the one or more processors, cause the one or more processors to perform the method.

The method 1000 at 1010 includes activating a TC data archiving service between the TC data archiving function and at least a first UE of a UE companion pair that comprises the first UE and a second UE. As previously discussed, the first UE may subscribe for TC data archiving services provided by the TC data archiving function (as discussed herein) to intelligently capture an immutable archive of TC data communicated between the first UE and the second UE. In some embodiments, activating the TC data archiving service may include authenticating one or both of the first UE and the second UE, for example using a device identifier (ID). The TC data may be communicated between the first UE and the second UE through the operator core network. In some embodiments, the TC data may be communication by a point-to-point RF wireless link between the first UE and the second UE. The TC data may include, for example, command data generated by a controller UE that is used to control the operation of a remote controlled UE. The TC data may include telemetry data generated by the remote controlled UE.

The method 1000 at 1012 includes receiving a first session block sequence from the first UE, the first session block sequence comprising a first set of TC data representing TC data communicated between the first UE and the second UE. As described with respect to FIGS. 5A and 5B, a session block sequence may comprises a sequence of session blocks, where each block is associated with a snapshot of TC data captured by the distributed TC data archiving application (e.g., DApp 430). Each block of the sequence may include, for example, one or more of a block sequence number, a UE ID that includes a unique identification code of the UE (such as the UE device ID 418, for example), a UE notarization stamp, and collected TC data. In some embodiments, the block may comprise part of a smart contract, where implementing code associated with the DApp may also be included within a block. The method 1000 at 1014 includes storing the first session block sequence to an immutable TC data archive in the data store. The immutable TC data archive may comprise, for example, at least one of a distributed ledger technology (DLT), a Hyperledger technology, or a block-chain technology.

Referring to FIG. 11, a diagram is depicted of an exemplary computing environment suitable for use in implementations of the present disclosure. In particular, the exemplary computer environment is shown and designated generally as computing device 1100. Computing device 1100 is but one example of a suitable computing environment and is not intended to suggest any limitation as to the scope of use or functionality of the embodiments described herein. Neither should computing device 1100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 11, computing device 1100 includes bus 1110 that directly or indirectly couples the following devices: memory 1112, one or more processors 1114, one or more presentation components 1116, input/output (I/O) ports 1118, I/O components 1120, power supply 1122, and radio 1124. Bus 1110 represents what may be one or more busses (such as an address bus, data bus, or combination thereof). The devices of FIG. 11 are shown with lines for the sake of clarity. However, it should be understood that the functions performed by one or more components of the computing device 1100 may be combined or distributed amongst the various components. For example, a presentation component such as a display device may be one of I/O components 1120. In some embodiments, the UE 110 may comprise a computing device 1100. In some embodiments, the TC data archiving function 107 may be implemented on a network node of network operator core 106 that may comprise a computing device 1100. In some embodiments, a UE 110 (e.g., a UE 110-A and/or a UE 110-b) may be implemented using a computing device such as computing device 1100. The processors of computing device 1100, such as one or more processors 1114, have memory. The present disclosure hereof recognizes that such is the nature of the art, and reiterates that FIG. 11 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 11 and refer to "computer" or "computing device." In some embodiments, a TC data archiving function as described in any of the examples of this disclosure (such as the TC data archiving function 107, for example) may be implemented at least in part by code executed by the one or more processors(s) 1114. The immutable TC data archive 130 may be stored or otherwise implemented at least in part by memory 1112.

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes non-transient RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media and computer-readable media do not comprise a propagated data signal or signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer-storage media in the form of volatile and/or nonvolatile memory. Memory 1112 may be removable, non-removable, or a combination thereof. Exemplary memory includes solid-state memory, hard drives, optical-disc drives, etc. Computing device 1100 includes one or more processors 1114 that read data from various entities such as bus 1110, memory 1112 or I/O components 1120. One or more presentation components 1116 presents data indications to a person or other device. Exemplary one or more presentation components 1116 include a display device, speaker, printing component, vibrating component, etc. I/O ports 1118 allow computing device 1100 to be logically coupled to other devices including I/O components 1120, some of which may be built in computing device 1100. Illustrative I/O components 1120 include a microphone, joystick, game pad, satellite dish, scanner, printer, wireless device, etc.

Radio(s) 1124 represents a radio that facilitates communication with a wireless telecommunications network. For example, radio(s) 1124 may be used to establish communications with components of the access network 104, operator core network 106 and/or core network edge 105. Illustrative wireless telecommunications technologies include CDMA, GPRS, TDMA, GSM, and the like. Radio 1124 might additionally or alternatively facilitate other types of wireless communications including Wi-Fi, WiMAX, LTE, and/or other VoTP communications. As can be appreciated, in various embodiments, radio(s) 1124 can be configured to support multiple technologies and/or multiple radios can be utilized to support multiple technologies. A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Referring to FIG. 12, a diagram is depicted general at 1200 of an exemplary cloud computing environment 1210 for implementing one or more aspects of a TC data archiving service as implemented by the systems and methods described herein (such as the TC data archiving function(s) 107, for example). Cloud computing environment 1210 is but one example of a suitable cloud-computing environment and is not intended to suggest any limitation as to the scope of use or functionality of the embodiments presented herein. Neither should cloud-computing environment 1210 be interpreted as having any dependency or requirement relating to any one or combination of components illustrated. In some embodiments, the cloud-computing environment 1210 is executed within operator core network 106, the core network edge 105, or otherwise coupled to the core network edge 105 or operator core network 106.

Cloud computing environment 1210 includes one or more controllers 1220 comprising one or more processors and memory. The controllers 1220 may comprise servers of a data center. In some embodiments, the controllers 1220 are programmed to execute code to implement at least one or more aspects of the TC data archiving function(s) 107.

For example, in one embodiment the TC data archiving function(s) 107 are virtualized network functions (VNFs) 1230 running on a worker node cluster 1225 established by the controllers 1220. The cluster of worker nodes 1225 may include one or more orchestrated Kubernetes (K8s) pods that realize one or more containerized applications 1235 for the TC data archiving function(s) 107. In some embodiments, the UE 110 may be coupled to the controllers 1220 of the cloud-computing environment 1210 by access network 104. In some embodiments, immutable TC data archive 130 may be implemented at least in part as one or more data store persistent volumes 1240 in the cloud-computing environment 1210.

In various alternative embodiments, system and/or device elements, method steps, or example implementations described throughout this disclosure (such as the UE, access network, core network edge, operator core network, UE telemetry-command data archiving function(s), immutable TC data archive, and/or or any of the sub-parts thereof, for example) may be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer-readable media" refers to tangible memory storage devices having non-transient physical forms. Such non-transient physical forms may include computer memory devices, such as but not limited to: punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system of device having a physical, tangible form. Program instructions include, but are not limited to, computer executable instructions executed by computer system processors and hardware description languages such as Verilog or Very High Speed Integrated Circuit (VHSIC) Hardware Description Language (VHDL).

As used herein, the terms "function", "unit", "server", "node" and "module" are used to describe computer processing components and/or one or more computer executable services being executed on one or more computer processing components. In the context of this disclosure, such terms used in this manner would be understood by one skilled in the art to refer to specific network elements and not used as nonce word or intended to invoke 35 U.S.C. 112(f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for providing immutable telemetry-command (TC) data archiving over a communications network, the system comprising:
   a first user equipment (UE) comprising:
   one or more processors; and
   one or more computer-readable media storing computer-usable instructions that, when executed by the one or more processors, cause the one or more processors to:
   establish a first communication link with a network function of an operator core network comprising a telemetry-command data archiving function;
   activate a telemetry-command data archiving service with the telemetry-command data archiving function;
   communicate telemetry-command data with a second UE comprising a companion UE of a UE companion pair, wherein the UE companion pair includes the first UE and the second UE;
   determine a sub-set of the telemetry-command data for archiving;
   generate a session block sequence using an application on the first UE comprising a block-chain technology authenticated with the telemetry-command data archiving function, wherein the sub-set of the telemetry-command data is reported to the telemetry-command data archiving function using the session block sequence; and
   store the sub-set of the telemetry-command data to an immutable telemetry-command data archive by reporting the sub-set of the telemetry-command data to the telemetry-command data archiving function.

2. The system of claim 1, the one or more processors further to:
determine the sub-set of the telemetry-command data for archiving based on an inflection criteria.

3. The system of claim 2, wherein the inflection criteria is based on at least one of:
a change in telemetry data;
a predefined set of commands;
a predefined set of conditions;
a predefined set of events; and
a command to change an operating parameter.

4. The system of claim 2, the one or more processors further to:
adjust the inflection criteria based on a change in an operating condition of one or both of the first UE and the second UE.

5. The system of claim 1, the one or more processors further to:
generate the session block sequence using a distributed application (DApp).

6. The system of claim 5, the one or more processors further to:
generate the session block sequence to include at least one device identifier (ID) assigned to at least one of, the first UE, the second UE, and the UE companion pair.

7. The system of claim 5, the one or more processors further to:
generate the session block sequence to include at least one of:
a first device identifier (ID) of the first UE and a second device ID of the second UE; or
a device ID of the UE companion pair.

8. The system of claim 1, the one or more processors further to:
apply a notarization stamp to one or more session blocks of the session block sequence, the notarization stamp certifying that the session block sequence is generated by certified software.

9. The system of claim 1, wherein the immutable telemetry-command data archive comprises at least one of a distributed ledger technology (DLT), a Hyperledger technology, or a block-chain technology.

10. The system of claim 1, wherein the sub-set of the telemetry- command data comprises:
command data;
telemetry data; or
a combination of the command data and the telemetry data.

11. The system of claim 1, wherein either:
the first UE comprises a controller UE and the second UE comprises a remote controlled UE responsive to command data received from the first UE; or
the second UE comprises the controller UE and the first UE comprises the remote controlled UE responsive to command data received from the second UE.

12. The system of claim 1, wherein either the first UE or the second UE is integrated within:
a remote controlled vehicle responsive to the telemetry-command data;
a remote controlled drone responsive to the telemetry-command data;
a remote controlled robot responsive to the telemetry-command data; or
a remote controlled industrial machine responsive to the telemetry-command data.

13. The system of claim 1, wherein the first UE is coupled to the operator core network through an access network comprising at least one of:
a radio access network; and
a non-3rd Generation Partnership Project (3GPP) access network.

14. A telecommunications network, the network comprising:
an operator core network;
at least one access network coupled to the operator core network, wherein the at least one access network communicates uplink (UL) and downlink (DL) signals between one or more user equipment (UE) and the operator core network;
a telemetry-command data archiving function executing on one or more processors of at least one network node of the operator core network, wherein the telemetry-command data archiving function is coupled to at least one data store, the telemetry-command data archiving function performing operations to:
activate a telemetry-command data archiving service between the telemetry-command data archiving function and at least a first UE of a UE companion pair that comprises the first UE and a second UE;
receive, from an application on the first UE comprising a block-chain technology authenticated with the telemetry-command data archiving function, a first session block sequence from the first UE, the first session block sequence comprising a first set of telemetry-command data representing telemetry-command data communicated between the first UE and the second UE; and
store the first session block sequence to an immutable telemetry-command data archive in the at least one data store.

15. The network of claim 14, wherein the telemetry-command data is communicated between the first UE and the second UE through the operator core network.

16. The network of claim 14, the telemetry-command data archiving function performing operations further to:
receive, from an application on the second UE comprising a block-chain technology authenticated with the telemetry-command data archiving function, a second session block sequence from the second UE, the second session block sequence comprising a second set of telemetry-command data representing the telemetry-command data communicated between the first UE and the second UE; and
store the second session block sequence to the immutable telemetry-command data archive in the at least one data store.

17. The network of claim 16, the telemetry-command data archiving function performing operations further to:
associate the first session block sequence with the second session block sequence in the immutable telemetry-command data archive using a least one of:
a device identifier (ID) assigned to the first UE;
a device ID assigned to the second UE; and
a device ID assigned to the UE companion pair.

18. The network of claim 14, wherein the immutable telemetry-command data archive comprises at least one of a distributed ledger technology (DLT), a Hyperledger technology, or a block-chain technology.

19. A method for a telemetry-command (TC) data archiving service, the method comprising:
establishing a first communication link between a first user equipment (UE) and a network function of an operator core network, the network function comprising a telemetry-command data archiving function;

activating a telemetry-command data archiving service between the first UE and the telemetry-command data archiving function;

communicating telemetry-command data between the first UE and a second UE comprising a companion UE of a UE companion pair, wherein the UE companion pair includes the first UE and the second UE;

determining a sub-set of the telemetry-command data for archiving;

generating a session block sequence using an application on the first UE comprising a block-chain technology authenticated with the telemetry-command data archiving function, wherein the sub-set of the telemetry-command data is reported to the telemetry-command data archiving function using the session block sequence; and storing the sub-set of the telemetry-command data to an immutable telemetry-command data archive using the telemetry-command data archiving function.

20. The method of claim 19, further comprising:

determining the sub-set of the telemetry-command data for archiving based on an inflection criteria, wherein the inflection criteria is based on at least one of:

a change in telemetry data;

a predefined set of commands;

a predefined set of conditions;

a predefined set of events; and a command to change an operating parameter.

* * * * *